United States Patent
Beg et al.

(10) Patent No.: US 12,267,769 B2
(45) Date of Patent: *Apr. 1, 2025

(54) ISOLATION OF ELECTRONIC ENVIRONMENT FOR IMPROVED CHANNEL ESTIMATION

(71) Applicant: COGNITIVE SYSTEMS CORP., Waterloo (CA)

(72) Inventors: Chris Beg, Waterloo (CA); Mohammad Omer, Waterloo (CA)

(73) Assignee: COGNITIVE SYSTEMS CORP., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,594

(22) Filed: Sep. 1, 2023

(65) Prior Publication Data
US 2023/0422156 A1    Dec. 28, 2023

Related U.S. Application Data

(63) Continuation of application No. 18/162,423, filed on Jan. 31, 2023, now Pat. No. 11,770,760, which is a
(Continued)

(51) Int. Cl.
H04W 48/16     (2009.01)
H04L 25/02     (2006.01)
H04W 84/12     (2009.01)

(52) U.S. Cl.
CPC ......... *H04W 48/16* (2013.01); *H04L 25/0204* (2013.01); *H04W 84/12* (2013.01)

(58) Field of Classification Search
CPC .... H04W 48/16; H04W 84/12; H04L 25/0204
See application file for complete search history.

(56) References Cited

U.S. PATENT DOCUMENTS 11,770,760 B2 *  9/2023  Beg ................... H04L 25/025
                                                                  370/338
2012/0106611 A1  5/2012  Kim et al.
(Continued)

FOREIGN PATENT DOCUMENTS

| GB | 2472774 A | 2/2011 |
| JP | 2021-503072 A | 2/2021 |
| JP | 2021-166704 A | 10/2021 |

OTHER PUBLICATIONS

Jiang et al., "Eliminating the Barriers: Demystifying Wi-Fi Baseband Design and Introducing the PicoScenes Wi-Fi Sensing Platform," IEEE Internet of Things Journal 9(6):4476-4496 (2022).
(Continued)

*Primary Examiner* — Mohammad S Anwar
(74) *Attorney, Agent, or Firm* — MEDLER FERRO WOODHOUSE & MILLS PLLC

(57) ABSTRACT

Systems and methods for Wi-Fi sensing are provided. A method for Wi-Fi sensing carried out by a sensing decision unit in operation on at least one processor configured to execute instructions. Measured channel state information (M-CSI) representing a sensing measurement and receiver front end state information (RFE-SI) are received. According to the RFE-SI, sensing decision input information is determined.

22 Claims, 23 Drawing Sheets

Related U.S. Application Data continuation of application No. PCT/IB2022/060308, filed on Oct. 26, 2022.

(60) Provisional application No. 63/284,305, filed on Nov. 30, 2021, provisional application No. 63/273,572, filed on Oct. 29, 2021.

(56) References Cited

U.S. PATENT DOCUMENTS

| | | |
|---|---|---|
| 2015/0311971 A1 | 10/2015 | Learned et al. |
| 2020/0064456 A1 | 2/2020 | Xu et al. |
| 2020/0191943 A1 | 6/2020 | Wu et al. |
| 2020/0209372 A1 | 7/2020 | Seth et al. |
| 2020/0359248 A1 | 11/2020 | Sadeghi et al. |
| 2021/0103045 A1 | 4/2021 | Kravets et al. |
| 2021/0273735 A1 | 9/2021 | Da Silva et al. |
| 2022/0070710 A1 | 3/2022 | Lim et al. |
| 2022/0304051 A1 | 9/2022 | Aboul-Magd et al. |

OTHER PUBLICATIONS

Wang et al., "Ranging and fingerprinting-based indoor Wi-Fi localisation using channel state information," IET Commun. 13(14):2106-2114 (2019).

\* cited by examiner

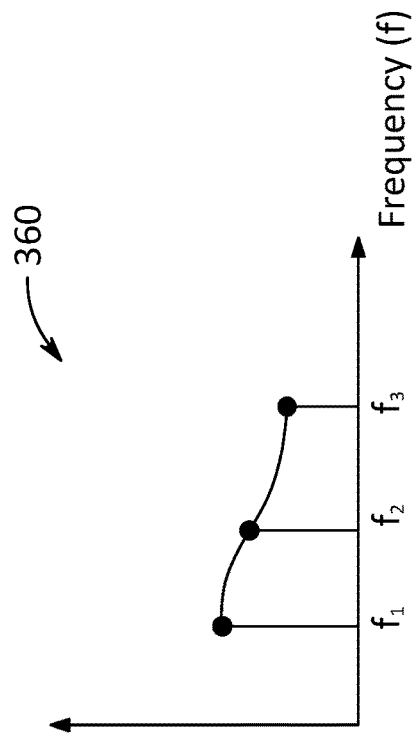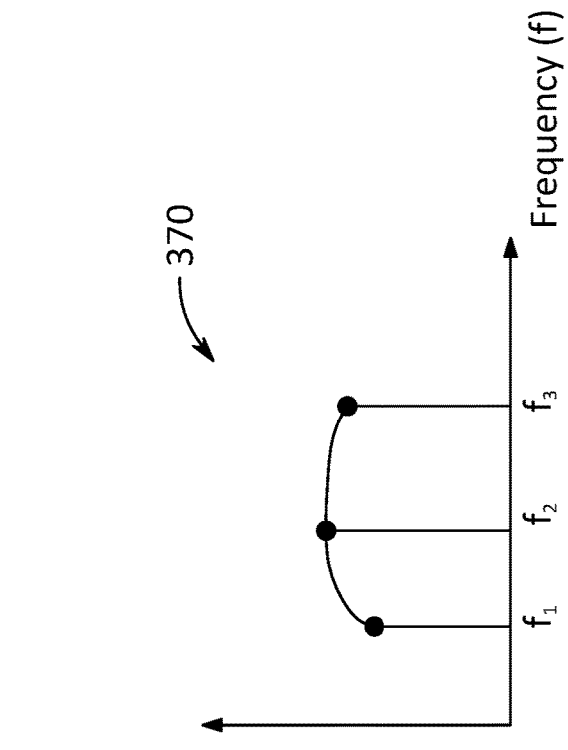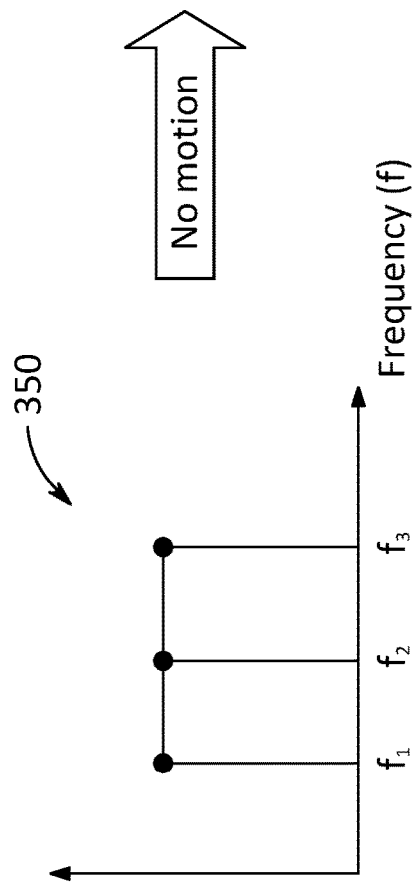
FIG. 3A
FIG. 3B

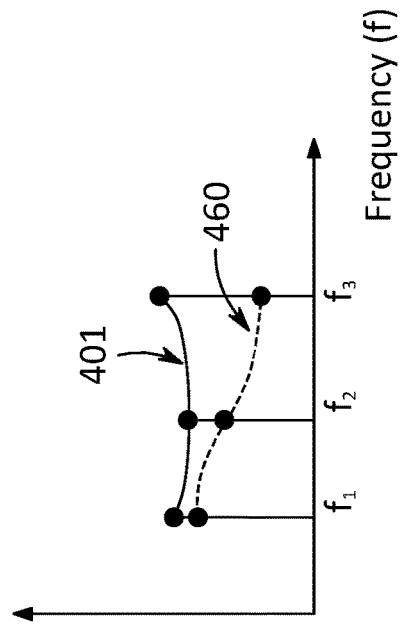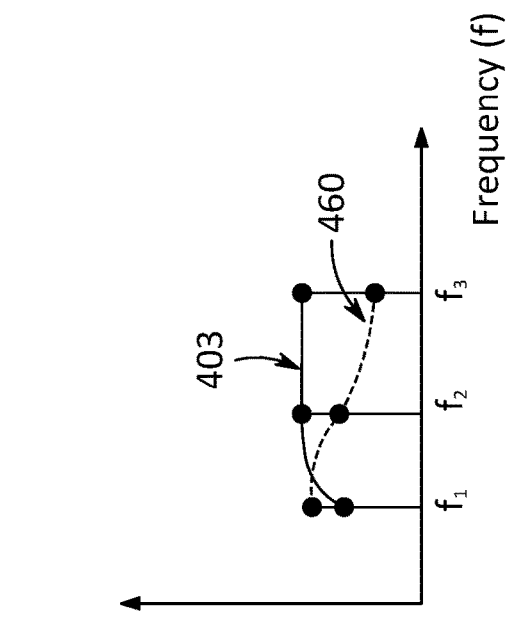
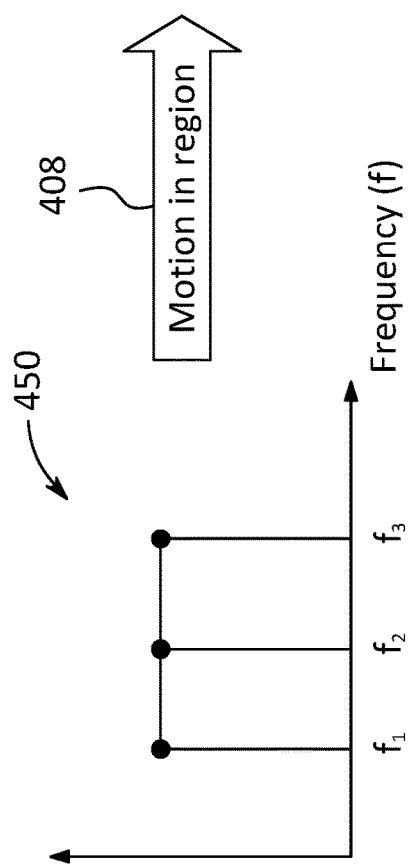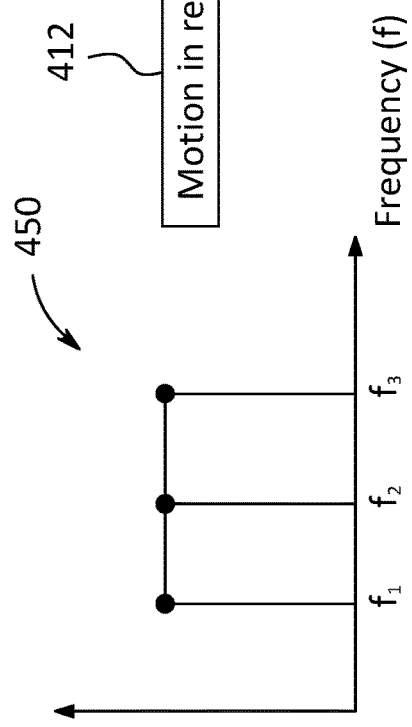
FIG. 4C
FIG. 4D

ISOLATION OF ELECTRONIC ENVIRONMENT FOR IMPROVED CHANNEL ESTIMATION

CROSS-REFERENCE TO RELATED APPLICATIONS

The present application is a continuation of U.S. application Ser. No. 18/162,423, which claims benefit of U.S. Provisional Appl. No. 63/273,572, filed Oct. 29, 2021, and U.S. Provisional Appl. No. 63/284,305, filed Nov. 30, 2021, the entire contents of each of which are incorporated by reference herein.

TECHNICAL FIELD

The present disclosure generally relates to systems and methods for Wi-Fi sensing. In particular, the present disclosure relates to systems and methods for isolation of electronic environment for improved channel estimation.

BACKGROUND OF THE DISCLOSURE

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems, and other types of systems. A Wi-Fi sensing system is one recent addition to motion detection systems. The Wi-Fi sensing system may be a network of Wi-Fi-enabled devices that may be a part of an IEEE 802.11 network. In an example, the Wi-Fi sensing system may be configured to detect features of interest in a sensing space. The sensing space may refer to any physical space in which the Wi-Fi sensing system may operate, such as a place of residence, a place of work, a shopping mall, a sports hall or sports stadium, a garden, or any other physical space. The features of interest may include motion of objects and motion tracking, presence detection, intrusion detection, gesture recognition, fall detection, breathing rate detection, and other applications.

In the Wi-Fi sensing system, Wi-Fi sensing may be performed based on detecting perturbations in over the air (OTA) channel defined as the propagation of a transmitted signal between a transmitter antenna and a receiver antenna. The OTA channel is a wireless channel between a transmitter antenna and a receiver antenna. In an example, a transmitted signal may be generated at a baseband transmitter and received at a baseband receiver. Further, the received signal may be processed at the baseband receiver for determination of channel state information (CSI). The CSI may be used to determine motion of an object in a sensing space. The CSI obtained through processing of the received signal by the baseband receiver may include perturbations occurring in or caused by front-end components in the baseband transmitter and the baseband receiver in addition to the CSI of the OTA channel. Since the perturbations caused by the front-end components are not the result of the object's motion occurring in the sensing space, for accurate Wi-Fi sensing, the CSI used to determine motion should only include the perturbations occurring in the OTA channel, and not include any perturbations occurring in or caused by the front-end components in the baseband transmitter and the baseband receiver.

BRIEF SUMMARY OF THE DISCLOSURE

The present disclosure generally relates to systems and methods for Wi-Fi sensing. In particular, the present disclosure relates to systems and methods for isolation of electronic environment for improved channel estimation.

Systems and methods are provided for Wi-Fi sensing. In an example embodiment, a method for Wi-Fi sensing is described. The method is carried out by a sensing decision unit in operation on at least one processor. The method includes receiving, by the sensing decision unit, measured channel state information (M-CSI) representing a sensing measurement, receiving, by the sensing decision unit, receiver front end state information (RFE-SI), and determining, by the sensing decision unit and according to the RFE-SI, sensing decision input information.

In some embodiments, the method further includes receiving, by a receiving device including a receiver front end (RFE) having a receiving antenna, sensing transmissions from a plurality of sensing transmitters and generating, by the receiving device, the M-CSI based on the sensing transmissions.

In some embodiments, the receiving device further includes the at least one processor.

In some embodiments, the RFE-SI is provided as a message to the sensing decision unit by a baseband processor of the receiving device.

In some embodiments, the RFE-SI is provided as one or more digital signals to the sensing decision unit by at least one of a baseband processor of the receiving device and the RFE.

In some embodiments, the RFE-SI is provided as one or more digital signals and one or more analog signals to the sensing decision unit by at least one of a baseband processor of the receiving device and the RFE.

In some embodiments, the RFE-SI includes a phase variation indicator.

In some embodiments, determining the sensing decision input information includes setting the sensing decision input information to a null input responsive to a determination that the phase variation indicator indicates a phase variation in the M-CSI.

In some embodiments, the RFE-SI includes automatic gain controller (AGC) information.

In some embodiments, determining the sensing decision input information includes setting the sensing decision input information to a null input responsive to a determination that the AGC information does not exceed a first threshold.

In some embodiments, determining the sensing decision input information includes generating processed channel state information (P-CSI) by multiplying a portion of the M-CSI by an AGC scaling factor responsive to a determination that the AGC information does not exceed a first threshold and setting the sensing decision input information to the P-CSI.

In some embodiments, determining the sensing decision input information includes generating processed channel state information (P-CSI) by multiplying a portion of the M-CSI by an AGC scaling factor responsive to a first determination that the AGC information does not exceed a first threshold and a second determination that a root-mean-square of the portion of the M-CSI does not exceed a second threshold, and setting the sensing decision output information to the P-CSI.

In some embodiments, determining the sensing decision input information includes setting the sensing decision input information to the M-CSI responsive to a first determination that the AGC information exceeds a first threshold and a second determination that a root-mean-square of the portion of the M-CSI exceeds a second threshold.

In some embodiments, the RFE-SI includes downconverter type information.

In some embodiments, determining the sensing decision input information includes calculating a group delay of the M-CSI according to the downconverter type information, generating processed channel state information (P-CSI) by adjusting the M-CSI according to the group delay, and setting the sensing decision input information to the P-CSI.

In some embodiments, the method further includes sending the sensing decision input information to a sensing algorithm manager.

In another example embodiment, a system for Wi-Fi sensing is described. The system includes at least one processor configured to execute instructions to operate a sensing decision unit, the instructions being configured to receive, by the sensing decision unit, M-CSI representing a sensing measurement, to receive, by the sensing decision unit, RFE-SI, and to determine, by the sensing decision unit and according to the RFE-SI, sensing decision input information.

Other aspects and advantages of the disclosure will become apparent from the following detailed description, taken in conjunction with the accompanying drawings, which illustrate by way of example, the principles of the disclosure.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 3A and FIG. 3B are plots showing examples of channel responses computed from the wireless signals communicated between wireless communication devices in FIG. 2A and FIG. 2B;

FIG. 4C and FIG. 4D are plots showing the example channel responses of FIG. 4A and FIG. 4B overlaid on an example channel response associated with no motion occurring in the space;

DETAILED DESCRIPTION

Figure 1:
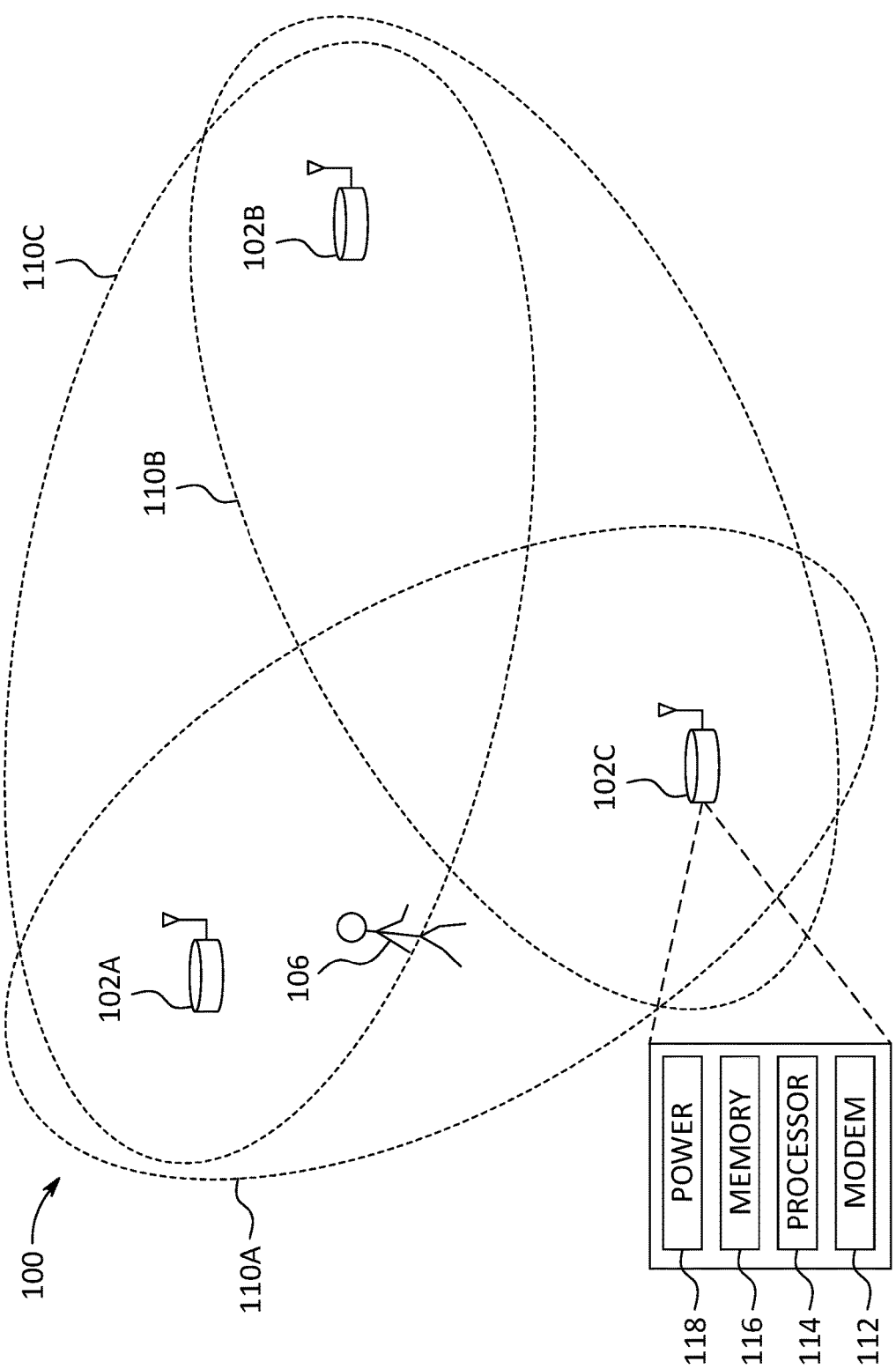
FIG. 1 is a diagram showing an example wireless communication system.

In some aspects of what is described here, a wireless sensing system can be used for a variety of wireless sensing applications by processing wireless signals (e.g., radio frequency signals) transmitted through a space between wireless communication devices. Example wireless sensing applications include motion detection, which can include the following: detecting motion of objects in the space, motion tracking, breathing detection, breathing monitoring, presence detection, gesture detection, gesture recognition, human detection (moving and stationary human detection), human tracking, fall detection, speed estimation, intrusion detection, walking detection, step counting, respiration rate detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications. Other examples of wireless sensing applications include object recognition, speaking recognition, keystroke detection and recognition, tamper detection, touch detection, attack detection, user authentication, driver fatigue detection, traffic monitoring, smoking detection, school violence detection, human counting, metal detection, human recognition, bike localization, human queue estimation, Wi-Fi imaging, and other types of wireless sensing applications. For instance, the wireless sensing system may operate as a motion detection system to detect the existence and location of motion based on Wi-Fi signals or other types of wireless signals. As described in more detail below, a wireless sensing system may be configured to control measurement rates, wireless connections, and device participation, for example, to improve system operation or to achieve other technical advantages. The system improvements and technical advantages achieved when the wireless sensing system is used for motion detection are also achieved in examples where the wireless sensing system is used for another type of wireless sensing application.

In some example wireless sensing systems, a wireless signal includes a component (e.g., a synchronization preamble in a Wi-Fi PHY frame, or another type of component) that wireless devices can use to estimate a channel response or other channel information, and the wireless sensing system can detect motion (or another characteristic depending on the wireless sensing application) by analyzing changes in the channel information collected over time. In some examples, a wireless sensing system can operate similar to a bistatic radar system, where a Wi-Fi access point (AP) assumes the receiver role, and each Wi-Fi device (station or node or peer) connected to the AP assumes the transmitter role. The wireless sensing system may trigger a connected device to generate a transmission and produce a channel response measurement at a receiver device. This triggering process can be repeated periodically to obtain a sequence of time variant measurements. A wireless sensing algorithm may then receive the generated time-series of channel response measurements (e.g., computed by Wi-Fi receivers) as input, and through a correlation or filtering process, may then make a determination (e.g., determine if there is motion or no motion within the environment represented by the channel response, for example, based on changes or patterns in the channel estimations). In examples where the wireless sensing system detects motion, it may also be possible to identify a location of the motion within the environment based on motion detection results among a number of wireless devices.

Accordingly, wireless signals received at each of the wireless communication devices in a wireless communication network may be analyzed to determine channel information for the various communication links (between respective pairs of wireless communication devices) in the network. The channel information may be representative of a physical medium that applies a transfer function to wireless signals that traverse a space. In some instances, the channel information includes a channel response. Channel responses can characterize a physical communication path, representing the combined effect of, for example, scattering, fading, and power decay within the space between the transmitter and receiver. In some instances, the channel information includes beamforming state information (e.g., a feedback matrix, a steering matrix, channel state information (CSI), etc.) provided by a beamforming system. Beamforming is a signal processing technique often used in multi antenna (multiple-input/multiple-output (MIMO)) radio systems for directional signal transmission or reception. Beamforming can be achieved by operating elements in an antenna array in such a way that signals at particular angles experience constructive interference while others experience destructive interference.

The channel information for each of the communication links may be analyzed (e.g., by a hub device or other device in a wireless communication network, or a sensing transmitter communicably coupled to the network) to, for example, detect whether motion has occurred in the space, to determine a relative location of the detected motion, or both. In some aspects, the channel information for each of the communication links may be analyzed to detect whether an object is present or absent, e.g., when no motion is detected in the space.

In some cases, a wireless sensing system can control a node measurement rate. For instance, a Wi-Fi motion system may configure variable measurement rates (e.g., channel estimation/environment measurement/sampling rates) based on criteria given by a current wireless sensing application (e.g., motion detection). In some implementations, when no motion is present or detected for a period of time, for example, the wireless sensing system can reduce the rate that the environment is measured, such that the connected device will be triggered less frequently. In some implementations, when motion is present, for example, the wireless sensing system can increase the triggering rate to produce a time-series of measurements with finer time resolution. Controlling the variable measurement rate can allow energy conservation (through the device triggering), reduce processing (less data to correlate or filter), and improve resolution during specified times.

In some cases, a wireless sensing system can perform band steering or client steering of nodes throughout a wireless network, for example, in a Wi-Fi multi-AP or Extended Service Set (ESS) topology, multiple coordinating wireless APs each provide a Basic Service Set (BSS) which may occupy different frequency bands and allow devices to transparently move between from one participating AP to another (e.g., mesh). For instance, within a home mesh network, Wi-Fi devices can connect to any of the APs, but typically select one with a good signal strength. The coverage footprint of the mesh APs typically overlap, often putting each device within communication range or more than one AP. If the AP supports multi-bands (e.g., 2.4 GHz and GHz), the wireless sensing system may keep a device connected to the same physical AP but instruct it to use a different frequency band to obtain more diverse information to help improve the accuracy or results of the wireless sensing algorithm (e.g., motion detection algorithm). In some implementations, the wireless sensing system can change a device from being connected to one mesh AP to being connected to another mesh AP. Such device steering can be performed, for example, during wireless sensing (e.g., motion detection), based on criteria detected in a specific area to improve detection coverage, or to better localize motion within an area.

In some cases, beamforming may be performed between wireless communication devices based on some knowledge of the communication channel (e.g., through feedback properties generated by a receiver), which can be used to generate one or more steering properties (e.g., a steering matrix) that are applied by a transmitter device to shape the transmitted beam/signal in a particular direction or directions. Thus, changes to the steering or feedback properties used in the beamforming process indicate changes, which may be caused by moving objects, in the space accessed by the wireless communication system. For example, motion may be detected by substantial changes in the communication channel, e.g., as indicated by a channel response, or steering or feedback properties, or any combination thereof, over a period of time.

In some implementations, for example, a steering matrix may be generated at a transmitter device (beamformer) based on a feedback matrix provided by a receiver device (beamformee) based on channel sounding. Because the steering and feedback matrices are related to propagation characteristics of the channel, these matrices change as objects move within the channel. Changes in the channel characteristics are accordingly reflected in these matrices, and by analyzing the matrices, motion can be detected, and different characteristics of the detected motion can be determined. In some implementations, a spatial map may be generated based on one or more beamforming matrices. The spatial map may indicate a general direction of an object in a space relative to a wireless communication device. In some cases, many beamforming matrices (e.g., feedback matrices or steering matrices) may be generated to represent a multitude of directions that an object may be located relative to a wireless communication device. These many beamforming matrices may be used to generate the spatial map. The spatial map may be used to detect the presence of motion in the space or to detect a location of the detected motion.

In some instances, a motion detection system can control a variable device measurement rate in a motion detection process. For example, a feedback control system for a multi-node wireless motion detection system may adaptively change the sample rate based on the environment conditions. In some cases, such controls can improve operation of the motion detection system or provide other technical advantages. For example, the measurement rate may be controlled in a manner that optimizes or otherwise improves air-time usage versus detection ability suitable for a wide range of different environments and different motion detection applications. The measurement rate may be controlled in a manner that reduces redundant measurement data to be processed, thereby reducing processor load/power requirements. In some cases, the measurement rate is controlled in a manner that is adaptive, for instance, an adaptive sample can be controlled individually for each participating device. An adaptive sample rate can be used with a tuning control loop for different use cases, or device characteristics.

In some cases, a wireless sensing system can allow devices to dynamically indicate and communicate their wireless sensing capability or wireless sensing willingness to the wireless sensing system. For example, there may be times when a device does not want to be periodically interrupted or triggered to transmit a wireless signal that would allow the AP to produce a channel measurement. For instance, if a device is sleeping, frequently waking the device up to transmit or receive wireless sensing signals could consume resources (e.g., causing a cell-phone battery to discharge faster). These and other events could make a device willing or not willing to participate in wireless sensing system operations. In some cases, a cell phone running on its battery may not want to participate, but when the cell phone is plugged into the charger, it may be willing to participate. Accordingly, if the cell phone is unplugged, it may indicate to the wireless sensing system to exclude the cell phone from participating; whereas if the cell phone is plugged in, it may indicate to the wireless sensing system to include the cell phone in wireless sensing system operations. In some cases, if a device is under load (e.g., a device streaming audio or video) or busy performing a primary function, the device may not want to participate; whereas when the same device's load is reduced and participating will not interfere with a primary function, the device may indicate to the wireless sensing system that it is willing to participate.

Example wireless sensing systems are described below in the context of motion detection (detecting motion of objects in the space, motion tracking, breathing detection, breathing monitoring, presence detection, gesture detection, gesture recognition, human detection (moving and stationary human detection), human tracking, fall detection, speed estimation, intrusion detection, walking detection, step counting, respiration rate detection, apnea estimation, posture change detection, activity recognition, gait rate classification, gesture decoding, sign language recognition, hand tracking, heart rate estimation, breathing rate estimation, room occupancy detection, human dynamics monitoring, and other types of motion detection applications. However, the operation, system improvements, and technical advantages achieved when the wireless sensing system is operating as a motion detection system are also applicable in examples where the wireless sensing system is used for another type of wireless sensing application.

In various embodiments of the disclosure, non-limiting definitions of one or more terms that will be used in the document are provided below.

A term "transmission parameters" may refer to a set of IEEE 802.11 PHY transmitter configuration parameters which are defined as a part of transmission vector (TXVECTOR) corresponding to a specific PHY and which are configurable for each PHY-layer protocol data unit (PPDU) transmission.

A term "Null Data PPDU (NDP)" may refer to a PPDU that does not include data field. In an example, Null Data PPDU may be used for sensing transmission where it is the MAC header that includes the information required.

A term "Channel State Information (CSI)" may refer to properties of a communications channel that are known or measured by a technique of channel estimation. CSI may represent how wireless signals propagate from a sensing transmitter to a sensing receiver along multiple paths. CSI is typically a matrix of complex values representing the amplitude attenuation and phase shift of signals, which provides an estimation of a communications channel.

A term "sensing transmitter" may refer to a device that sends a transmission (for example, PPDUs) used for sensing measurements (for example, channel state information) in a sensing session. In an example, a station is an example of a sensing transmitter. In some examples, an access point may also be a sensing transmitter for Wi-Fi sensing purposes in the example where a station acts as a sensing receiver.

A term "sensing receiver" may refer to a device that receives a transmission (for example, PPDUs) sent by a sensing transmitter and performs one or more sensing measurements (for example, channel state information) in a sensing session. An access point is an example of a sensing receiver. In some examples, a station may also be a sensing receiver, for example in a mesh network scenario.

A term "sensing space" may refer to any physical space in which a Wi-Fi sensing system may operate.

A term "sensing initiator" may refer to a device that initiates a Wi-Fi sensing session. The role of sensing initiator may be taken on by the sensing receiver, the sensing transmitter, or a separate device which contains the sensing algorithm.

A term "Wireless Local Area Network (WLAN) sensing session" may refer to a period during which objects in a physical space may be probed, detected and/or characterized. In an example, during a WLAN sensing session, several devices participate in, and thereby contribute to the generation of sensing measurements.

A term "sensing trigger message" may refer to a message sent from a sensing transmitter to a sensing receiver to initiate or trigger one or more sensing transmissions. The sensing transmissions may, in some examples, be carried by an UL-OFDMA sensing trigger or an UL-OFDMA compound sensing trigger. The sensing trigger message may also be known as a sensing initiation message.

A term "sensing response message" may refer to a message which is included within the sensing transmission from the sensing transmitter to the sensing receiver. The sensing transmission that includes the sensing response message is used by the sensing receiver to perform a sensing measurement.

A term "sensing transmission" may refer to a transmission made from the sensing transmitter to the sensing receiver which may be used to make a sensing measurement. In an example, a sensing transmission may also be referred to as wireless sensing signal or wireless signal.

A term "sensing measurement" may refer to a measurement of a state of a channel between a transmitter device (for example, a sensing transmitter) and a receiver device (for example, a sensing receiver) derived from a sensing transmission. In an example, sensing measurement may also be referred to as channel response measurement.

A term "sensing goal" may refer to a goal of a sensing activity at a time. A sensing goal is not static and may change at any time. In an example, the sensing goal may require sensing measurements of a specific type, a specific format, or a specific precision, resolution, or accuracy to be available to a sensing algorithm.

A term "sensing algorithm" may refer to a computational algorithm that achieves a sensing goal. The sensing algorithm may be executed on any device in a Wi-Fi sensing system.

A term "requested transmission configuration" may refer to requested transmission parameters of a sensing transmitter to be used when sending a sensing transmission.

A term "automatic gain controller (AGC)" may refer to a form of signal amplifier whose gain is automatically adjusted corresponding to a received signal strength.

A term "measured channel state information (M-CSI)" may represent how wireless signals propagate from a transmitter to a receiver along multiple paths. M-CSI is typically a matrix of complex values representing amplitude attenuation and phase shift of signals, which provides an estimation of a communications channel. The M-CSI may be provided by a baseband receiver (or a baseband processor).

A term "processed channel state information (P-CSI)" may refer to a corrected form of M-CSI, that has been adjusted according to AGC information, phase variation indicator, and downconverter type information.

A term "group delay" may refer to a characteristic of a physical channel or an electronic element (for example, a filter), representing a phase shift amount of a signal caused by the physical channel and the electronic element as a function of frequency.

A term "notch filter" may refer to a type of band stop filter that attenuates frequencies within a specific range while passing all other frequencies without attenuation or with minimal attenuation.

A term "low-intermediate frequency (low-IF) downconverter" may refer to a downconverter that uses two stages of frequency mixers. The first stage converts a radio frequency signal to a low intermediate frequency (IF) signal, and the second stage converts the IF signal to a baseband signal.

A term "phase locking loop (PLL)" may refer to a phase negative feedback loop that generates an output signal whose phase is related to and tracks the phase of an input signal.

A term "over the air (OTA) channel" may refer to a wireless channel between a transmitter antenna and a receiver antenna.

A term "zero-IF downconverter" may refer to a downconverter that uses a single stage of frequency mixer to directly convert a received radio frequency signal to a baseband signal.

For purposes of reading the description of the various embodiments below, the following descriptions of the sections of the specifications and their respective contents may be helpful:

Section A describes a wireless communications system, wireless transmissions and sensing measurements which may be useful for practicing embodiments described herein.

Section B describes systems and methods that are useful for a Wi-Fi sensing system configured to send sensing transmissions and make sensing measurements.

Section C describes embodiments of systems and methods for isolation of electronic environment for improved channel estimation.

A. Wireless Communications System, Wireless Transmissions, and Sensing Measurements FIG. 1 illustrates wireless communication system 100. Wireless communication system 100 includes three wireless communication devices: first wireless communication device 102A, second wireless communication device 102B, and third wireless communication device 102C. Wireless communication system 100 may include additional wireless communication devices and other components (e.g., additional wireless communication devices, one or more network servers, network routers, network switches, cables, or other communication links, etc.).

Wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®., Near Field Communication (NFC), Zig-Bee), millimeter wave communications, and others.

In some implementations, wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others.

In the example shown in FIG. 1, wireless communication devices 102A, 102B, 102C can be, or they may include standard wireless network components. For example, wireless communication devices 102A, 102B, 102C may be commercially available Wi-Fi access point (AP) or another type of wireless access point (WAP) performing one or more operations as described herein that are embedded as instructions (e.g., software or firmware) on the modem of the WAP. In some cases, wireless communication devices 102A, 102B, 102C may be nodes of a wireless mesh network, such as, for example, a commercially available mesh network system (e.g., Plume Wi-Fi, Google Wi-Fi, Qualcomm Wi-Fi SoN, etc.). In some cases, another type of standard or conventional Wi-Fi transmitter device may be used. In some instances, one or more of wireless communication devices 102A, 102B, 102C may be implemented as WAPs in a mesh network, while other wireless communication device(s)

102A, 102B, 102C are implemented as leaf devices (e.g., mobile devices, smart devices, etc.) that access the mesh network through one of the WAPs. In some cases, one or more of wireless communication devices 102A, 102B, 102C is a mobile device (e.g., a smartphone, a smart watch, a tablet, a laptop computer, etc.), a wireless-enabled device (e.g., a smart thermostat, a Wi-Fi enabled camera, a smart TV), or another type of device that communicates in a wireless network.

Wireless communication devices 102A, 102B, 102C may be implemented without Wi-Fi components; for example, other types of standard or non-standard wireless communication may be used for motion detection. In some cases, wireless communication devices 102A, 102B, 102C can be, or they may be part of, a dedicated motion detection system. For example, the dedicated motion detection system can include a hub device and one or more beacon devices (as remote sensor devices), and wireless communication devices 102A, 102B, 102C can be either a hub device or a beacon device in the motion detection system.

As shown in FIG. 1, wireless communication device 102C includes modem 112, processor 114, memory 116, and power unit 118; any of wireless communication devices 102A, 102B, 102C in wireless communication system 100 may include the same, additional, or different components, and the components may be configured to operate as shown in FIG. 1 or in another manner. In some implementations, modem 112, processor 114, memory 116, and power unit 118 of a wireless communication device are housed together in a common housing or other assembly. In some implementations, one or more of the components of a wireless communication device can be housed separately, for example, in a separate housing or other assembly.

Modem 112 can communicate (receive, transmit, or both) wireless signals. For example, modem 112 may be configured to communicate radio frequency (RF) signals formatted according to a wireless communication standard (e.g., Wi-Fi or Bluetooth). Modem 112 may be implemented as the example wireless network modem 112 shown in FIG. 1, or may be implemented in another manner, for example, with other types of components or subsystems. In some implementations, modem 112 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in modem 112 can include one or more antennas and radio frequency circuitry. The RF circuitry can include, for example, circuitry that filters, amplifies, or otherwise conditions analog signals, circuitry that up-converts baseband signals to RF signals, circuitry that down-converts radio frequency signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include a radio chip, an RF front end, and one or more antennas. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some implementations, the antenna includes multiple antennas.

In some cases, a baseband subsystem in modem 112 can include, for example, digital electronics configured to process digital baseband data. As an example, the baseband subsystem may include a baseband chip. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in modem 112 receives baseband signals from the baseband subsystem, up-converts the baseband signals to radio frequency (RF) signals, and wirelessly transmits the radio frequency signals (e.g., through an antenna). In some instances, the radio subsystem in modem 112 wirelessly receives radio frequency signals (e.g., through an antenna), down-converts the radio frequency signals to baseband signals, and sends the baseband signals to the baseband subsystem. The signals exchanged between the radio subsystem, and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the baseband subsystem of modem 112 can communicate wireless network traffic (e.g., data packets) in the wireless communication network through the radio subsystem on one or more network traffic channels. The baseband subsystem of modem 112 may also transmit or receive (or both) signals (e.g., motion probe signals or motion detection signals) through the radio subsystem on a dedicated wireless communication channel. In some instances, the baseband subsystem generates motion probe signals for transmission, for example, to probe a space for motion. In some instances, the baseband subsystem processes received motion detection signals (signals based on motion probe signals transmitted through the space), for example, to detect motion of an object in a space.

Processor 114 can execute instructions, for example, to generate output data based on data inputs. The instructions can include programs, codes, scripts, or other types of data stored in memory. Additionally, or alternatively, the instructions can be encoded as pre-programmed or re-programmable logic circuits, logic gates, or other types of hardware or firmware components. Processor 114 may be or include a general-purpose microprocessor, as a specialized co-processor or another type of data processing apparatus. In some cases, processor 114 performs high level operation of the wireless communication device 102C. For example, processor 114 may be configured to execute or interpret software, scripts, programs, functions, executables, or other instructions stored in memory 116. In some implementations, processor 114 may be included in modem 112.

Memory 116 can include computer-readable storage media, for example, a volatile memory device, a non-volatile memory device, or both. Memory 116 can include one or more read-only memory devices, random-access memory devices, buffer memory devices, or a combination of these and other types of memory devices. In some instances, one or more components of the memory can be integrated or otherwise associated with another component of wireless communication device 102C. Memory 116 may store instructions that are executable by processor 114. For example, the instructions may include instructions for time-aligning signals using an interference buffer and a motion detection buffer, such as through one or more of the operations of the example processes as described in any of FIGS. 15, 16, 17, 18, 19A, and 19B.

Power unit 118 provides power to the other components of wireless communication device 102C. For example, the other components may operate based on electrical power provided by power unit 118 through a voltage bus or other connection. In some implementations, power unit 118 includes a battery or a battery system, for example, a rechargeable battery. In some implementations, power unit 118 includes an adapter (e.g., an AC adapter) that receives an external power signal (from an external source) and coverts the external power signal to an internal power signal conditioned for a component of wireless communication device 102C. Power unit 118 may include other components or operate in another manner.

In the example shown in FIG. 1, wireless communication devices 102A, 102B transmit wireless signals (e.g., according to a wireless network standard, a motion detection protocol, or otherwise). For instance, wireless communication devices 102A, 102B may broadcast wireless motion probe signals (e.g., reference signals, beacon signals, status signals, etc.), or they may send wireless signals addressed to other devices (e.g., a user equipment, a client device, a server, etc.), and the other devices (not shown) as well as wireless communication device 102C may receive the wireless signals transmitted by wireless communication devices 102A, 102B. In some cases, the wireless signals transmitted by wireless communication devices 102A, 102B are repeated periodically, for example, according to a wireless communication standard or otherwise.

In the example shown, wireless communication device 102C processes the wireless signals from wireless communication devices 102A, 102B to detect motion of an object in a space accessed by the wireless signals, to determine a location of the detected motion, or both. For example, wireless communication device 102C may perform one or more operations of the example processes described below with respect to any of FIGS. 15, 16, 17, 18, 19A, and 19B, or another type of process for detecting motion or determining a location of detected motion. The space accessed by the wireless signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that wireless communication device 102C can transmit wireless signals and wireless communication devices 102A, 102B can processes the wireless signals from wireless communication device 102C to detect motion or determine a location of detected motion.

The wireless signals used for motion detection can include, for example, a beacon signal (e.g., Bluetooth Beacons, Wi-Fi Beacons, other wireless beacon signals), another standard signal generated for other purposes according to a wireless network standard, or non-standard signals (e.g., random signals, reference signals, etc.) generated for motion detection or other purposes. In examples, motion detection may be carried out by analyzing one or more training fields carried by the wireless signals or by analyzing other data carried by the signal. In some examples data will be added for the express purpose of motion detection or the data used will nominally be for another purpose and reused or repurposed for motion detection. In some examples, the wireless signals propagate through an object (e.g., a wall) before or after interacting with a moving object, which may allow the moving object's movement to be detected without an optical line-of-sight between the moving object and the transmission or receiving hardware. Based on the received signals, wireless communication device 102C may generate motion detection data. In some instances, wireless communication device 102C may communicate the motion detection data to another device or system, such as a security system, which may include a control center for monitoring movement within a space, such as a room, building, outdoor area, etc.

In some implementations, wireless communication devices 102A, 102B can be modified to transmit motion probe signals (which may include, e.g., a reference signal, beacon signal, or another signal used to probe a space for motion) on a separate wireless communication channel (e.g., a frequency channel or coded channel) from wireless network traffic signals. For example, the modulation applied to the payload of a motion probe signal and the type of data or data structure in the payload may be known by wireless communication device 102C, which may reduce the amount of processing that wireless communication device 102C performs for motion sensing. The header may include additional information such as, for example, an indication of whether motion was detected by another device in communication system 100, an indication of the modulation type, an identification of the device transmitting the signal, etc.

In the example shown in FIG. 1, wireless communication system 100 is a wireless mesh network, with wireless communication links between each of wireless communication devices 102. In the example shown, the wireless communication link between wireless communication device 102C and wireless communication device 102A can be used to probe motion detection field 110A, the wireless communication link between wireless communication device 102C and wireless communication device 102B can be used to probe motion detection field 110B, and the wireless communication link between wireless communication device 102A and wireless communication device 102B can be used to probe motion detection field 110C. In some instances, each wireless communication device 102 detects motion in motion detection fields 110 accessed by that device by processing received signals that are based on wireless signals transmitted by wireless communication devices 102 through motion detection fields 110. For example, when person 106 shown in FIG. 1 moves in motion detection field 110A and motion detection field 110C, wireless communication devices 102 may detect the motion based on signals they received that are based on wireless signals transmitted through respective motion detection fields 110. For instance, wireless communication device 102A can detect motion of person 106 in motion detection fields 110A, 110C, wireless communication device 102B can detect motion of person 106 in motion detection field 110C, and wireless communication device 102C can detect motion of person 106 in motion detection field 110A.

In some instances, motion detection fields 110 can include, for example, air, solid materials, liquids, or another medium through which wireless electromagnetic signals may propagate. In the example shown in FIG. 1, motion detection field 110A provides a wireless communication channel between wireless communication device 102A and wireless communication device 102C, motion detection field 110B provides a wireless communication channel between wireless communication device 102B and wireless communication device 102C, and motion detection field 110C provides a wireless communication channel between wireless communication device 102A and wireless communication device 102B. In some aspects of operation, wireless signals transmitted on a wireless communication channel (separate from or shared with the wireless communication channel for network traffic) are used to detect movement of an object in a space. The objects can be any type of static or moveable object and can be living or inanimate. For example, the object can be a human (e.g., person 106 shown in FIG. 1), an animal, an inorganic object, or another device, apparatus, or assembly), an object that defines all or part of the boundary of a space (e.g., a wall, door, window, etc.), or another type of object. In some implementations, motion information from the wireless communication devices may be analyzed to determine a location of the detected motion. For example, as described further below, one of wireless communication devices 102 (or another device communicably coupled to wireless communications devices 102) may determine that the detected motion is nearby a particular wireless communication device.

Figure 2A:
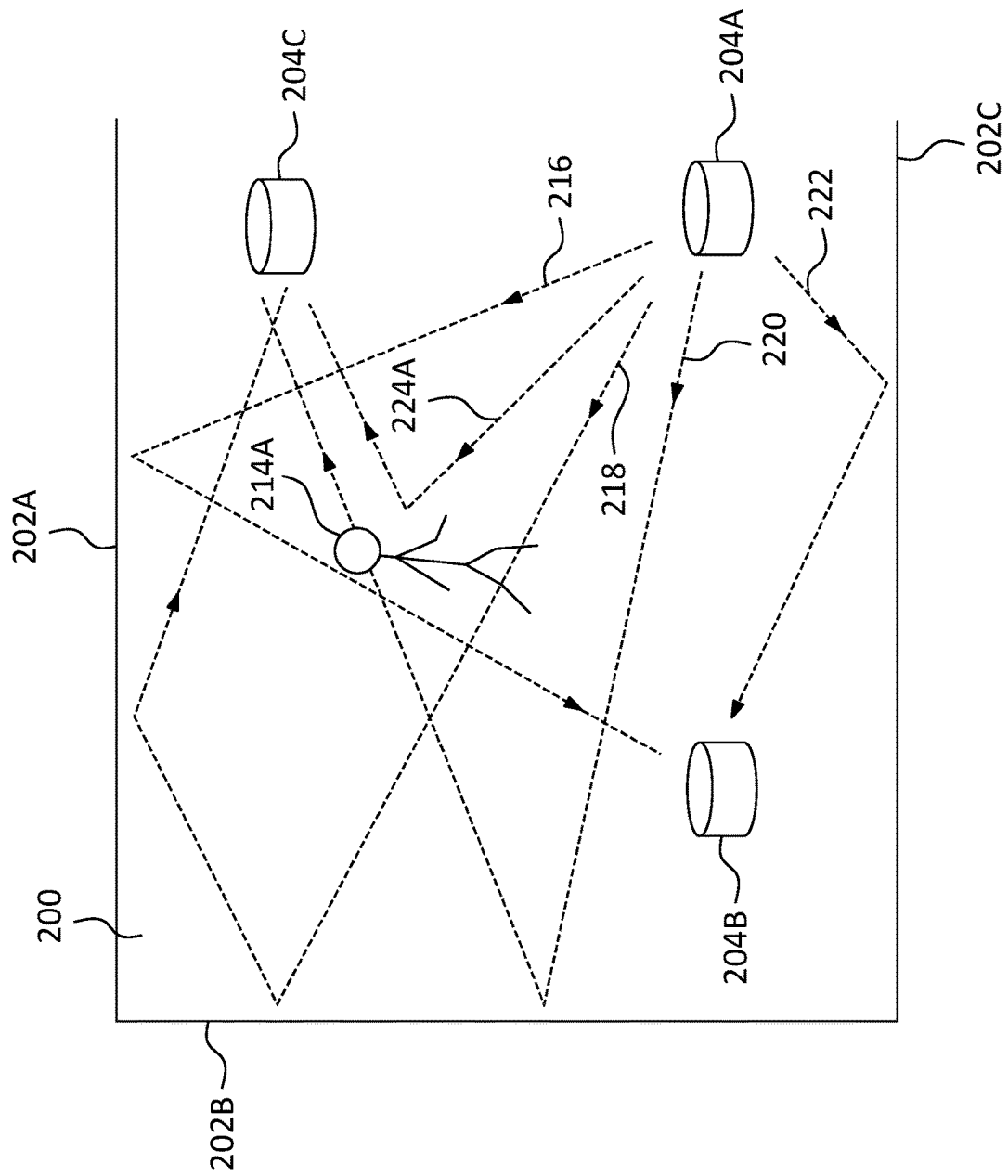
FIG. 2A and FIG. 2B are diagrams showing example wireless signals communicated between wireless communication devices.
Figure 2B:
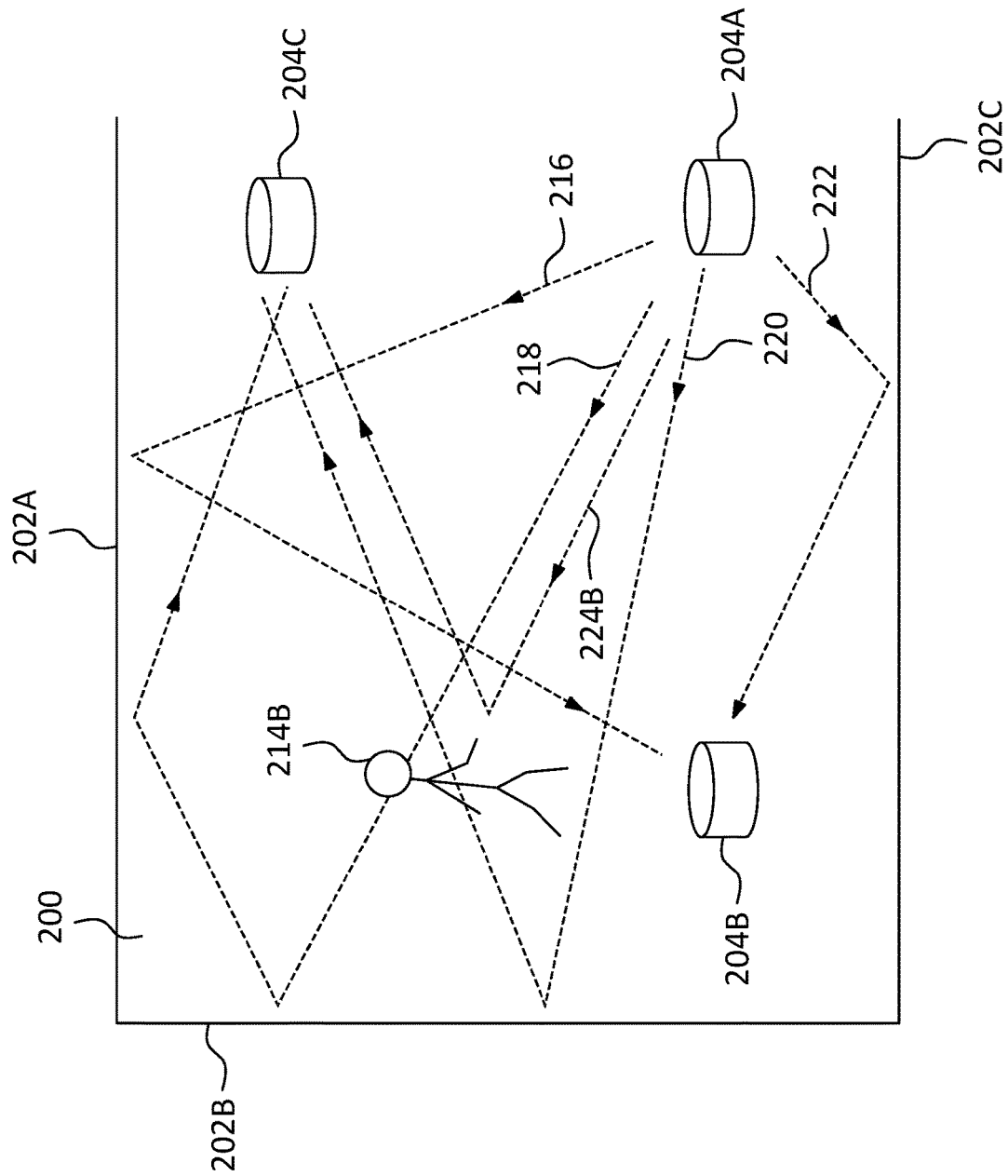

FIG. 2A and FIG. 2B are diagrams showing example wireless signals communicated between wireless communication devices 204A, 204B, 204C. Wireless communication devices 204A, 204B, 204C can be, for example, wireless communication devices 102A, 102B, 102C shown in FIG. 1, or other types of wireless communication devices. Wireless communication devices 204A, 204B, 204C transmit wireless signals through space 200. Space 200 can be completely or partially enclosed or open at one or more boundaries. Space 200 can be or can include an interior of a room, multiple rooms, a building, an indoor area, outdoor area, or the like. First wall 202A, second wall 202B, and third wall 202C at least partially enclose space 200 in the example shown.

In the example shown in FIG. 2A and FIG. 2B, wireless communication device 204A is operable to transmit wireless signals repeatedly (e.g., periodically, intermittently, at scheduled, unscheduled, or random intervals, etc.). Wireless communication devices 204B, 204C are operable to receive signals based on those transmitted by wireless communication device 204A. Wireless communication devices 204B, 204C each have a modem (e.g., modem 112 shown in FIG. 1) that is configured to process received signals to detect motion of an object in space 200.

As shown, an object is in first position 214A in FIG. 2A, and the object has moved to second position 214B in FIG. 2B. In FIG. 2A and FIG. 2B, the moving object in space 200 is represented as a human, but the moving object can be another type of object. For example, the moving object can be an animal, an inorganic object (e.g., a system, device, apparatus, or assembly), an object that defines all or part of the boundary of space 200 (e.g., a wall, door, window, etc.), or another type of object.

As shown in FIG. 2A and FIG. 2B, multiple example paths of the wireless signals transmitted from wireless communication device 204A are illustrated by dashed lines. Along first signal path 216, the wireless signal is transmitted from wireless communication device 204A and reflected off first wall 202A toward the wireless communication device 204B. Along second signal path 218, the wireless signal is transmitted from the wireless communication device 204A and reflected off second wall 202B and first wall 202A toward wireless communication device 204C. Along third signal path 220, the wireless signal is transmitted from the wireless communication device 204A and reflected off second wall 202B toward wireless communication device 204C. Along fourth signal path 222, the wireless signal is transmitted from the wireless communication device 204A and reflected off third wall 202C toward the wireless communication device 204B.

In FIG. 2A, along fifth signal path 224A, the wireless signal is transmitted from wireless communication device 204A and reflected off the object at first position 214A toward wireless communication device 204C. Between FIG. 2A and FIG. 2B, a surface of the object moves from first position 214A to second position 214B in space 200 (e.g., some distance away from first position 214A). In FIG. 2B, along sixth signal path 224B, the wireless signal is transmitted from wireless communication device 204A and reflected off the object at second position 214B toward wireless communication device 204C. Sixth signal path 224B depicted in FIG. 2B is longer than fifth signal path 224A depicted in FIG. 2A due to the movement of the object from first position 214A to second position 214B. In some examples, a signal path can be added, removed, or otherwise modified due to movement of an object in a space.

The example wireless signals shown in FIG. 2A and FIG. 2B may experience attenuation, frequency shifts, phase shifts, or other effects through their respective paths and may have portions that propagate in another direction, for example, through the first, second and third walls 202A, 202B, and 202C. In some examples, the wireless signals are radio frequency (RF) signals. The wireless signals may include other types of signals.

In the example shown in FIG. 2A and FIG. 2B, wireless communication device 204A can repeatedly transmit a wireless signal. In particular, FIG. 2A shows the wireless signal being transmitted from wireless communication device 204A at a first time, and FIG. 2B shows the same wireless signal being transmitted from wireless communication device 204A at a second, later time. The transmitted signal can be transmitted continuously, periodically, at random or intermittent times or the like, or a combination thereof. The transmitted signal can have a number of frequency components in a frequency bandwidth. The transmitted signal can be transmitted from wireless communication device 204A in an omnidirectional manner, in a directional manner or otherwise. In the example shown, the wireless signals traverse multiple respective paths in space 200, and the signal along each path may become attenuated due to path losses, scattering, reflection, or the like and may have a phase or frequency offset.

As shown in FIG. 2A and FIG. 2B, the signals from first to sixth paths 216, 218, 220, 222, 224A, and 224B combine at wireless communication device 204C and wireless communication device 204B to form received signals. Because of the effects of the multiple paths in space 200 on the transmitted signal, space 200 may be represented as a transfer function (e.g., a filter) in which the transmitted signal is input and the received signal is output. When an object moves in space 200, the attenuation or phase offset affected upon a signal in a signal path can change, and hence, the transfer function of space 200 can change. Assuming the same wireless signal is transmitted from wireless communication device 204A, if the transfer function of space 200 changes, the output of that transfer function—the received signal—will also change. A change in the received signal can be used to detect movement of an object.

Mathematically, a transmitted signal f(t) transmitted from the first wireless communication device 204A may be described according to Equation (1):

$$f(t) = \Sigma_{n=-\infty}^{\infty} c_n e^{j\omega_n t} \tag{1}$$

Where $\omega_n$ represents the frequency of nth frequency component of the transmitted signal, $c_n$ represents the complex coefficient of the nth frequency component, and t represents time. With the transmitted signal f(t) being transmitted from the first wireless communication device 204A, an output signal $r_k(t)$ from a path k may be described according to Equation (2):

$$r_k(t) = \Sigma_{n=-\infty}^{\infty} \alpha_{n,k} c_n e^{j(\omega_n t + \phi_{n,k})} \tag{2}$$

Where $\alpha_{n,k}$ represents an attenuation factor (or channel response; e.g., due to scattering, reflection, and path losses) for the nth frequency component along path k, and $\phi_{n,k}$ represents the phase of the signal for nth frequency component along path k. Then, the received signal R at a wireless communication device can be described as the summation of all output signals $r_k(t)$ from all paths to the wireless communication device, which is shown in Equation (3):

$$R = \Sigma_k r_k(t) \tag{3}$$

Substituting Equation (2) into Equation (3) renders the following Equation (4):

$$R = \Sigma_k \Sigma_{n=-\infty}^{\infty} (\alpha_{n,k} e^{j\phi_{n,k}}) c_n e^{j\omega_n t} \tag{4}$$

The received signal R at a wireless communication device can then be analyzed. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $H_n$ may be represented as follows in Equation (5):

$$H_n = \Sigma_k c_n \alpha_{n,k} e^{j\phi_{n,k}} \tag{5}$$

The complex value $H_n$ for a given frequency component $\omega_n$ indicates a relative magnitude and phase offset of the received signal at that frequency component $\omega_n$. When an object moves in the space, the complex value $H_n$ changes due to the channel response $\alpha_{n,k}$ of the space changing. Accordingly, a change detected in the channel response can be indicative of movement of an object within the communication channel. In some instances, noise, interference, or other phenomena can influence the channel response detected by the receiver, and the motion detection system can reduce or isolate such influences to improve the accuracy and quality of motion detection capabilities. In some implementations, the overall channel response can be represented as follows in Equation (6):

$$h_{ch} = \Sigma_k \Sigma_{n=-\infty}^{\infty} \alpha_{n,k} \tag{6}$$

In some instances, the channel response $h_{ch}$ for a space can be determined, for example, based on the mathematical theory of estimation. For instance, a reference signal $R_{ef}$ can be modified with candidate channel responses ($h_{ch}$), and then a maximum likelihood approach can be used to select the candidate channel which gives best match to the received signal ($R_{cvd}$). In some cases, an estimated received signal ($\hat{R}_{cvd}$) is obtained from the convolution of the reference signal ($R_{ef}$) with the candidate channel responses ($h_{ch}$), and then the channel coefficients of the channel response ($h_{ch}$) are varied to minimize the squared error of the estimated received signal ($\hat{R}_{cvd}$). This can be mathematically illustrated as follows in Equation (7):

$$R_{cvd} = R_{ef} \otimes h_{ch} = \Sigma_{k=-m}^{m} R_{ef}(n-k) h_{ch}(k) \tag{7}$$

with the optimization criterion $$\min_{h_{ch}} \sum (\hat{R}_{cvd} - R_{cvd})^2$$

The minimizing, or optimizing, process can utilize an adaptive filtering technique, such as Least Mean Squares (LMS), Recursive Least Squares (RLS), Batch Least Squares (BLS), etc. The channel response can be a Finite Impulse Response (FIR) filter, Infinite Impulse Response (IIR) filter, or the like. As shown in the equation above, the received signal can be considered as a convolution of the reference signal and the channel response. The convolution operation means that the channel coefficients possess a degree of correlation with each of the delayed replicas of the reference signal. The convolution operation as shown in the equation above, therefore shows that the received signal appears at different delay points, each delayed replica being weighted by the channel coefficient.

FIG. 3A and FIG. 3B are plots showing examples of channel responses 360, 370 computed from the wireless signals communicated between wireless communication devices 204A, 204B, 204C in FIG. 2A and FIG. 2B. FIG. 3A and FIG. 3B also show frequency domain representation 350 of an initial wireless signal transmitted by wireless communication device 204A. In the examples shown, channel response 360 in FIG. 3A represents the signals received by wireless communication device 204B when there is no motion in space 200, and channel response 370 in FIG. 3B represents the signals received by wireless communication device 204B in FIG. 2B after the object has moved in space 200.

In the example shown in FIG. 3A and FIG. 3B, for illustration purposes, wireless communication device 204A transmits a signal that has a flat frequency profile (the magnitude of each frequency component $f_1$, $f_2$, and $f_3$ is the same), as shown in frequency domain representation 350. Because of the interaction of the signal with space 200 (and the objects therein), the signals received at wireless communication device 204B that are based on the signal sent from wireless communication device 204A are different from the transmitted signal. In this example, where the transmitted signal has a flat frequency profile, the received signal represents the channel response of space 200. As shown in FIG. 3A and FIG. 3B, channel responses 360, 370 are different from frequency domain representation 350 of the transmitted signal. When motion occurs in space 200, a variation in the channel response will also occur. For example, as shown in FIG. 3B, channel response 370 that is associated with motion of object in space 200 varies from channel response 360 that is associated with no motion in space 200.

Furthermore, as an object moves within space 200, the channel response may vary from channel response 370. In some cases, space 200 can be divided into distinct regions and the channel responses associated with each region may share one or more characteristics (e.g., shape), as described below. Thus, motion of an object within different distinct regions can be distinguished, and the location of detected motion can be determined based on an analysis of channel responses.

Figure 4A:
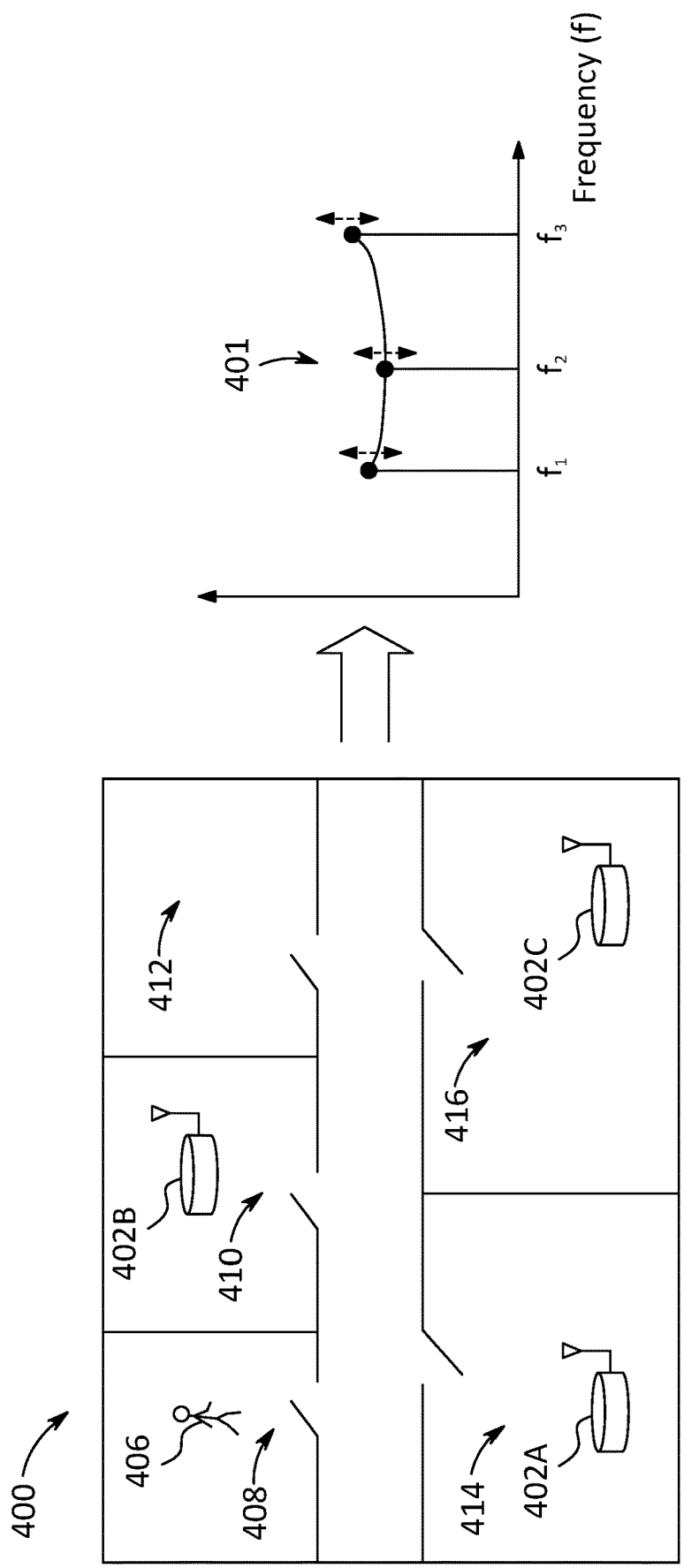
FIG. 4A and FIG. 4B are diagrams showing example channel responses associated with motion of an object in distinct regions of a space.
Figure 4B:
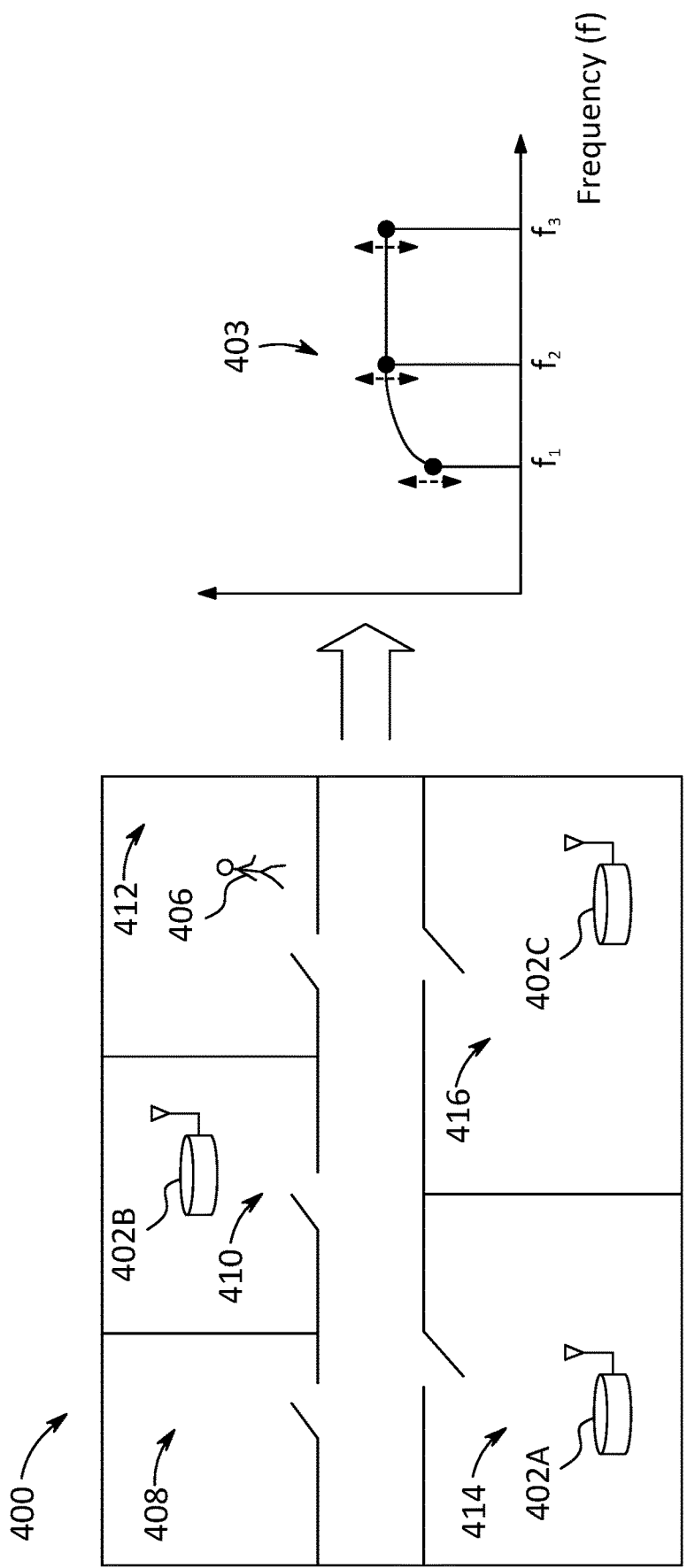

FIG. 4A and FIG. 4B are diagrams showing example channel responses 401, 403 associated with motion of object 406 in distinct regions 408, 412 of space 400. In the examples shown, space 400 is a building, and space 400 is divided into a plurality of distinct regions—first region 408, second region 410, third region 412, fourth region 414, and fifth region 416. Space 400 may include additional or fewer regions, in some instances. As shown in FIG. 4A and FIG. 4B, the regions within space 400 may be defined by walls between rooms. In addition, the regions may be defined by ceilings between floors of a building. For example, space 400 may include additional floors with additional rooms. In addition, in some instances, the plurality of regions of a space can be or include a number of floors in a multistory building, a number of rooms in the building, or a number of rooms on a particular floor of the building. In the example shown in FIG. 4A, an object located in first region 408 is represented as person 406, but the moving object can be another type of object, such as an animal or an inorganic object.

In the example shown, wireless communication device 402A is located in fourth region 414 of space 400, wireless communication device 402B is located in second region 410 of space 400, and wireless communication device 402C is located in fifth region 416 of space 400. Wireless communication devices 402 can operate in the same or similar manner as wireless communication devices 102 of FIG. 1. For instance, wireless communication devices 402 may be configured to transmit and receive wireless signals and detect whether motion has occurred in space 400 based on the received signals. As an example, wireless communication devices 402 may periodically or repeatedly transmit motion probe signals through space 400, and receive signals based on the motion probe signals. Wireless communication devices 402 can analyze the received signals to detect whether an object has moved in space 400, such as, for example, by analyzing channel responses associated with space 400 based on the received signals. In addition, in some implementations, wireless communication devices 402 can analyze the received signals to identify a location of detected motion within space 400. For example, wireless communication devices 402 can analyze characteristics of the channel response to determine whether the channel responses share the same or similar characteristics to channel responses known to be associated with first to fifth regions 408, 410, 412, 414, 416 of space 400.

In the examples shown, one (or more) of wireless communication devices 402 repeatedly transmits a motion probe signal (e.g., a reference signal) through space 400. The motion probe signals may have a flat frequency profile in some instances, wherein the magnitude of each frequency component $f_1$, $f_2$, and $f_3$. For example, the motion probe signals may have a frequency response similar to frequency domain representation 350 shown in FIG. 3A and FIG. 3B. The motion probe signals may have a different frequency profile in some instances. Because of the interaction of the reference signal with space 400 (and the objects therein), the signals received at another wireless communication device 402 that are based on the motion probe signal transmitted from the other wireless communication device 402 are different from the transmitted reference signal.

Based on the received signals, wireless communication devices 402 can determine a channel response for space 400. When motion occurs in distinct regions within the space, distinct characteristics may be seen in the channel responses. For example, while the channel responses may differ slightly for motion within the same region of space 400, the channel responses associated with motion in distinct regions may generally share the same shape or other characteristics. For instance, channel response 401 of FIG. 4A represents an example channel response associated with motion of object 406 in first region 408 of space 400, while channel response 403 of FIG. 4B represents an example channel response associated with motion of object 406 in third region 412 of space 400. Channel responses 401, 403 are associated with signals received by the same wireless communication device 402 in space 400.

FIG. 4C and FIG. 4D are plots showing channel responses 401, 403 of FIG. 4A and FIG. 4B overlaid on channel response 460 associated with no motion occurring in space 400. FIGS. 4C and 4D also show frequency domain representation 450 of an initial wireless signal transmitted by one or more of wireless communication devices 402A, 402B, 402C. When motion occurs in space 400, a variation in the channel response will occur relative to channel response 460 associated with no motion, and thus, motion of an object in space 400 can be detected by analyzing variations in the channel responses. In addition, a relative location of the detected motion within space 400 can be identified. For example, the shape of channel responses associated with motion can be compared with reference information (e.g., using a trained AI model) to categorize the motion as having occurred within a distinct region of space 400.

When there is no motion in space 400 (e.g., when object 406 is not present), wireless communication device 402 may compute channel response 460 associated with no motion. Slight variations may occur in the channel response due to a number of factors; however, multiple channel responses 460 associated with different periods of time may share one or more characteristics. In the example shown, channel response 460 associated with no motion has a decreasing frequency profile (the magnitude of each frequency component $f_1$, $f_2$, and $f_3$ is less than the previous). The profile of channel response 460 may differ in some instances (e.g., based on different room layouts or placement of wireless communication devices 402).

When motion occurs in space 400, a variation in the channel response will occur. For instance, in the examples shown in FIG. 4C and FIG. 4D, channel response 401 associated with motion of object 406 in first region 408 differs from channel response 460 associated with no motion and channel response 403 associated with motion of object 406 in third region 412 differs from channel response 460 associated with no motion. Channel response 401 has a concave-parabolic frequency profile (the magnitude of the middle frequency component $f_2$ is less than the outer frequency components $f_1$ and $f_3$), while channel response 403 has a convex-asymptotic frequency profile (the magnitude of the middle frequency component $f_2$ is greater than the outer frequency components $f_1$ and $f_3$). The profiles of channel responses 401, 403 may differ in some instances (e.g., based on different room layouts or placement of the wireless communication devices 402).

Analyzing channel responses may be considered similar to analyzing a digital filter. A channel response may be formed through the reflections of objects in a space as well as reflections created by a moving or static human. When a reflector (e.g., a human) moves, it changes the channel response. This may translate to a change in equivalent taps of a digital filter, which can be thought of as having poles and zeros (poles amplify the frequency components of a channel response and appear as peaks or high points in the response, while zeros attenuate the frequency components of a channel response and appear as troughs, low points, or nulls in the response). A changing digital filter can be characterized by the locations of its peaks and troughs, and a channel response may be characterized similarly by its peaks and troughs. For example, in some implementations, analyzing nulls and peaks in the frequency components of a channel response (e.g., by marking their location on the frequency axis and their magnitude), motion can be detected.

In some implementations, a time series aggregation can be used to detect motion. A time series aggregation may be performed by observing the features of a channel response over a moving window and aggregating the windowed result by using statistical measures (e.g., mean, variance, principal components, etc.). During instances of motion, the characteristic digital-filter features would be displaced in location and flip-flop between some values due to the continuous change in the scattering scene. That is, an equivalent digital filter exhibits a range of values for its peaks and nulls (due to the motion). By looking this range of values, unique profiles (in examples profiles may also be referred to as signatures) may be identified for distinct regions within a space.

In some implementations, an artificial intelligence (AI) model may be used to process data. AI models may be of a variety of types, for example linear regression models, logistic regression models, linear discriminant analysis models, decision tree models, naïve bayes models, K-nearest neighbors models, learning vector quantization models, support vector machines, bagging and random forest models, and deep neural networks. In general, all AI models aim to learn a function which provides the most precise correlation between input values and output values and are trained using historic sets of inputs and outputs that are known to be correlated. In examples, artificial intelligence may also be referred to as machine learning.

In some implementations, the profiles of the channel responses associated with motion in distinct regions of space 400 can be learned. For example, machine learning may be used to categorize channel response characteristics with motion of an object within distinct regions of a space. In some cases, a user associated with wireless communication devices 402 (e.g., an owner or other occupier of space 400) can assist with the learning process. For instance, referring to the examples shown in FIG. 4A and FIG. 4B, the user can move in each of first to fifth regions 408, 410, 412, 414, 416 during a learning phase and may indicate (e.g., through a user interface on a mobile computing device) that he/she is moving in one of the particular regions in space 400. For example, while the user is moving through first region 408 (e.g., as shown in FIG. 4A) the user may indicate on a mobile computing device that he/she is in first region 408 (and may name the region as "bedroom", "living room", "kitchen", or another type of room of a building, as appropriate). Channel responses may be obtained as the user moves through the region, and the channel responses may be "tagged" with the user's indicated location (region). The user may repeat the same process for the other regions of space 400. The term "tagged" as used herein may refer to marking and identifying channel responses with the user's indicated location or any other information.

The tagged channel responses can then be processed (e.g., by machine learning software) to identify unique characteristics of the channel responses associated with motion in the distinct regions. Once identified, the identified unique characteristics may be used to determine a location of detected motion for newly computed channel responses. For example, an AI model may be trained using the tagged channel responses, and once trained, newly computed channel responses can be input to the AI model, and the AI model can output a location of the detected motion. For example, in some cases, mean, range, and absolute values are input to an AI model. In some instances, magnitude and phase of the complex channel response itself may be input as well. These values allow the AI model to design arbitrary front-end filters to pick up the features that are most relevant to making accurate predictions with respect to motion in distinct regions of a space. In some implementations, the AI model is trained by performing a stochastic gradient descent. For instance, channel response variations that are most active during a certain zone may be monitored during the training, and the specific channel variations may be weighted heavily (by training and adapting the weights in the first layer to correlate with those shapes, trends, etc.). The weighted channel variations may be used to create a metric that activates when a user is present in a certain region.

For extracted features like channel response nulls and peaks, a time-series (of the nulls/peaks) may be created using an aggregation within a moving window, taking a snapshot of few features in the past and present, and using that aggregated value as input to the network. Thus, the network, while adapting its weights, will be trying to aggregate values in a certain region to cluster them, which can be done by creating a logistic classifier based decision surfaces. The decision surfaces divide different clusters and subsequent layers can form categories based on a single cluster or a combination of clusters.

In some implementations, an AI model includes two or more layers of inference. The first layer acts as a logistic classifier which can divide different concentration of values into separate clusters, while the second layer combines some of these clusters together to create a category for a distinct region. Additional, subsequent layers can help in extending the distinct regions over more than two categories of clusters. For example, a fully-connected AI model may include an input layer corresponding to the number of features tracked, a middle layer corresponding to the number of effective clusters (through iterating between choices), and a final layer corresponding to different regions. Where complete channel response information is input to the AI model, the first layer may act as a shape filter that can correlate certain shapes. Thus, the first layer may lock to a certain shape, the second layer may generate a measure of variation happening in those shapes, and third and subsequent layers may create a combination of those variations and map them to different regions within the space. The output of different layers may then be combined through a fusing layer.

B. Wi-Fi Sensing System Example Methods and Apparatus

Section B describes systems and methods that are useful for a Wi-Fi sensing system configured to send sensing transmissions and make sensing measurements.

Figure 5:
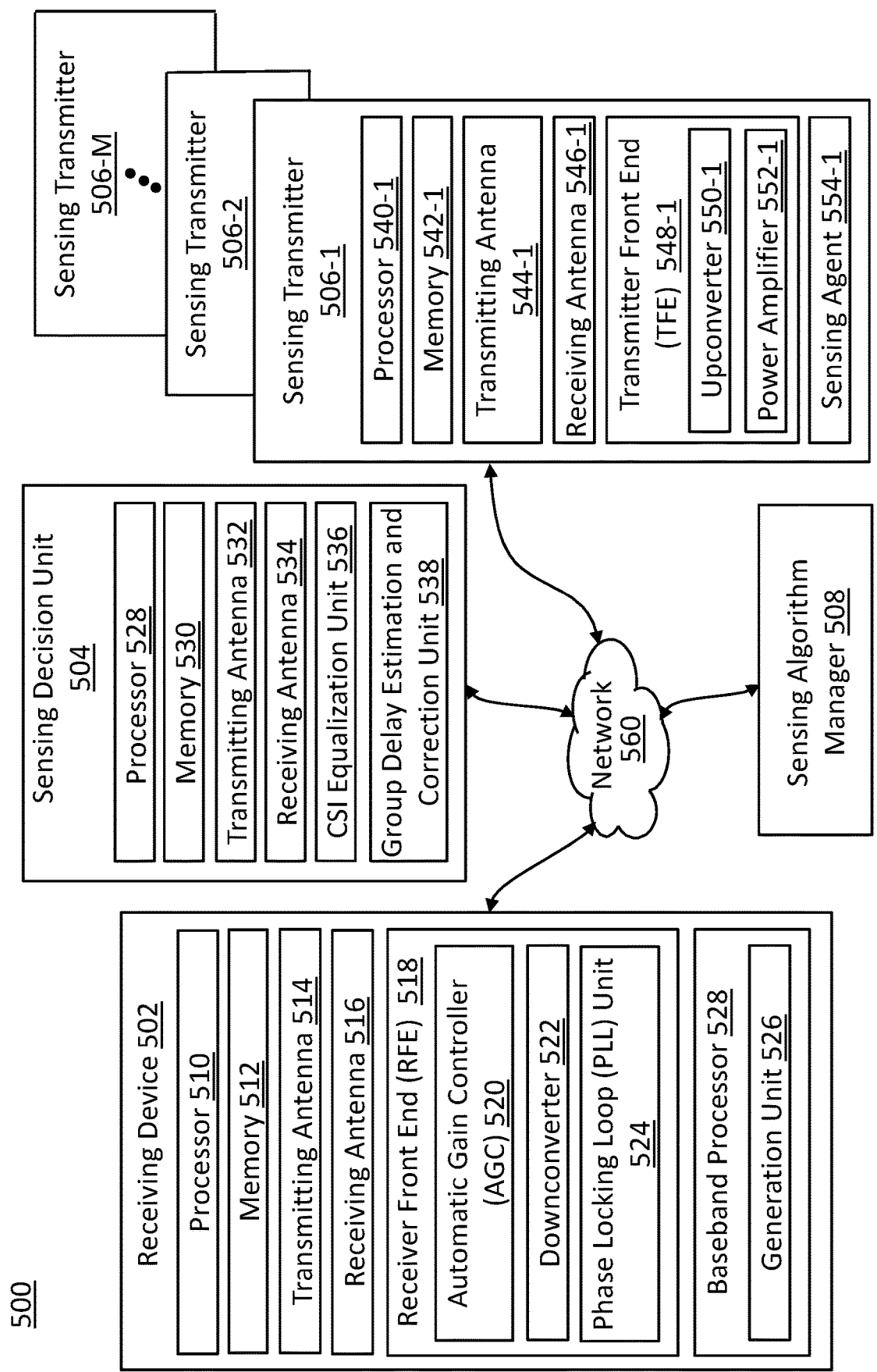
FIG. 5 depicts an implementation of some of an architecture of an implementation of a system for Wi-Fi sensing, according to some embodiments.

FIG. 5 depicts an implementation of some of an architecture of an implementation of system 500 for Wi-Fi sensing, according to some embodiments.

System 500 (alternatively referred to as Wi-Fi sensing system 500) may include receiving device 502, sensing decision unit 504, plurality of sensing transmitter 506-(1-M), sensing algorithm manager 508, and network 560 enabling communication between the system components for information exchange. System 500 may be an example or instance of wireless communication system 100 and network 560 may be an example or instance of wireless network or cellular network, details of which are provided with reference to FIG. 1 and its accompanying description.

According to an embodiment, receiving device 502 may be configured to receive a sensing transmission (for example, from each of plurality of sensing transmitters 506-(1-M)) and perform one or more measurements (for example, channel state information (CSI)) useful for Wi-Fi sensing. These measurements may be known as sensing measurements. The sensing measurements may be processed to achieve a sensing result of system 500, such as detecting motions or gestures. In an embodiment, receiving device 502 may be an access point. In some embodiments, receiving device 502 may take a role of sensing initiator.

According to an implementation, receiving device 502 may be implemented by a device, such as wireless communication device 102 shown in FIG. 1. In some implementations, receiving device 502 may be implemented by a device, such as wireless communication device 204 shown in FIG. 2A and FIG. 2B. Further, receiving device 502 may be implemented by a device, such as wireless communication device 402 shown in FIG. 4A and FIG. 4B. In an implementation, receiving device 502 may coordinate and control communication among plurality of sensing transmitters 506-(1-M). According to an implementation, receiving device 502 may be enabled to control a measurement campaign to ensure that required sensing transmissions are made at a required time and to ensure an accurate determination of sensing measurement. In some embodiments, receiving device 502 may process sensing measurements to achieve the sensing result of system 500. In some embodiments, receiving device 502 may be configured to transmit sensing measurements to sensing decision unit 504, and sensing decision unit 504 may be configured to process the sensing measurements to achieve the sensing result of system 500. In an example, the sensing measurement processed at sensing decision unit 504 may be referred to as measured CSI (M-CSI).

Referring again to FIG. 5, in some embodiments, each of plurality of sensing transmitters 506-(1-M) may form a part of a basic service set (BSS) and may be configured to send a sensing transmission to receiving device 502 based on which, one or more sensing measurements (for example, CSI) may be performed for Wi-Fi sensing. In an embodiment, each of plurality of sensing transmitters 506-(1-M) may be a station. According to an implementation, each of plurality of sensing transmitters 506-(1-M) may be implemented by a device, such as wireless communication device 102 shown in FIG. 1. In some implementations, each of plurality of sensing transmitters 506-(1-M) may be implemented by a device, such as wireless communication device 204 shown in FIG. 2A and FIG. 2B. Further, each of plurality of sensing transmitters 506-(1-M) may be implemented by a device, such as wireless communication device 402 shown in FIG. 4A and FIG. 4B. In some implementations, communication between receiving device 502 and each of plurality of sensing transmitters 506-(1-M) may happen via station management entity (SME) and media access control (MAC) layer management entity (MLME) protocols.

In some embodiments, sensing decision unit 504 may be configured to receive sensing measurements from receiving device 502 and process the sensing measurements. In an example, sensing decision unit 504 may process the sensing measurements. According to some implementations, sensing decision unit 504 may include/execute a sensing algorithm. In an embodiment, sensing decision unit 504 may be a station. In some embodiments, sensing decision unit 504 may be an access point. According to an implementation, sensing decision unit 504 may be implemented by a device, such as wireless communication device 102 shown in FIG. 1. In some implementations, sensing decision unit 504 may be implemented by a device, such as wireless communication device 204 shown in FIG. 2A and FIG. 2B. Further, sensing decision unit 504 may be implemented by a device, such as wireless communication device 402 shown in FIG. 4A and FIG. 4B. In some embodiments, sensing decision unit 504 may be any computing device, such as a desktop computer, a laptop, a tablet computer, a mobile device, a personal digital assistant (PDA) or any other computing device. In embodiments, sensing decision unit 504 may take a role of sensing initiator where a sensing algorithm determines a measurement campaign and the sensing measurements required to fulfill the measurement campaign. In embodiments, sensing decision unit 504 may be a sensing receiver. Sensing decision unit 504 may communicate the sensing measurements required to fulfill the measurement campaign to receiving device 502 to coordinate and control communication among plurality of sensing transmitters 506-(1-M). According to some implementations, sensing decision unit 504 may provide the processed sensing measurements to sensing algorithm manager 508 for identification of one or more features of interest.

According to some embodiments, sensing algorithm manager 508 may be configured to receive processed sensing measurements from sensing decision unit 504. In an example, sensing algorithm manager 508 may further process and analyze the processed sensing measurements to identify one or more features of interest. According to some implementations, sensing algorithm manager 508 may include/execute a sensing algorithm. In an embodiment, sensing algorithm manager 508 may be a station. In some embodiments, sensing algorithm manager 508 may be an access point. According to an implementation, sensing algorithm manager 508 may be implemented by a device, such as wireless communication device 102 shown in FIG. 1. In some implementations, sensing algorithm manager 508 may be implemented by a device, such as wireless communication device 204 shown in FIG. 2A and FIG. 2B. Further, sensing algorithm manager 508 may be implemented by a device, such as wireless communication device 402 shown in FIG. 4A and FIG. 4B. In some embodiments, sensing algorithm manager 508 may be any computing device, such as a desktop computer, a laptop, a tablet computer, a mobile device, a PDA or any other computing device. In embodiments, sensing algorithm manager 508 may take a role of sensing initiator where a sensing algorithm determines a measurement campaign and the sensing measurements required to fulfill the measurement campaign.

Referring to FIG. 5, in more detail, receiving device 502 may include processor 510 and memory 512. For example, processor 510 and memory 512 of receiving device 502 may be processor 114 and memory 116, respectively, as shown in FIG. 1. In an embodiment, receiving device 502 may further include transmitting antenna(s) 514, receiving antenna(s) 516, receiver front end (RFE) 518, and baseband processor 528. According to an embodiment, RFE 518 may include automatic gain controller (AGC) 520, downconverter 522, and phase locking loop (PLL) unit 524, and baseband processor 528 may include generation unit 526.

In some embodiments, an antenna may be used to both transmit and receive signals in a half-duplex format. When the antenna is transmitting, it may be referred to as transmitting antenna 514, and when the antenna is receiving, it may be referred to as receiving antenna 516. It is understood by a person of normal skill in the art that the same antenna may be transmitting antenna 514 in some instances and receiving antenna 516 in other instances. In the case of an antenna array, one or more antenna elements may be used to transmit or receive a signal, for example, in a beamforming environment. In some examples, a group of antenna elements used to transmit a composite signal may be referred to as transmitting antenna 514, and a group of antenna elements used to receive a composite signal may be referred to as receiving antenna 516. In some examples, each antenna is equipped with its own transmission and receive paths, which may be alternately switched to connect to the antenna depending on whether the antenna is operating as transmitting antenna 514 or receiving antenna 516.

In an implementation, AGC 520 may be a signal amplifier whose gain is automatically adjusted so that its output signal magnitude falls within a desired dynamic range acceptable by signal processing units that follow in a receive chain. According to an implementation, downconverter 522 may be configured to convert a received radio frequency signal back to an intermediate frequency (IF) signal, or a baseband signal for further processing. According to an implementation, downconverter 522 may be a low-IF downconverter or a zero-IF downconverter.

In an implementation, PLL unit 524 may be configured to generate an output signal whose phase is related to an input signal. According to an implementation, PLL unit 524 may be configured to provide downconverter 522 with one or more accurate and stable carrier frequency sources. In an implementation, the one or more accurate and stable carrier frequency sources may be used for down conversion of the radio frequency signal, frequency synchronization, and timing synchronization. In an implementation, the output signal of PLL unit 524 is related to the received radio frequency signal.

In an implementation, generation unit 526 may be coupled to processor 510 and memory 512. In some embodiments, generation unit 526 amongst other units, may include routines, programs, objects, components, data structures, etc., which may perform particular tasks or implement particular abstract data types. Generation unit 526 may also be implemented as, signal processor(s), state machine(s), logic circuitries, and/or any other device or component that manipulate signals based on operational instructions.

In some embodiments, generation unit 526 may be implemented in hardware, instructions executed by a processing unit, or by a combination thereof. The processing unit may comprise a computer, a processor, a state machine, a logic array or any other suitable devices capable of processing instructions. The processing unit may be a general-purpose processor that executes instructions to cause the general-purpose processor to perform the required tasks or, the processing unit may be dedicated to performing the required functions. In some embodiments, generation unit 526 may be machine-readable instructions that, when executed by a processor/processing unit, perform any of desired functionalities. The machine-readable instructions may be stored on an electronic memory device, hard disk, optical disk, or other machine-readable storage medium or non-transitory medium. In an implementation, the machine-readable instructions may also be downloaded to the storage medium via a network connection. In an example, machine-readable instructions may be stored in memory 512.

In an implementation, generation unit 526 may be responsible for receiving sensing transmissions and associated transmission parameters, calculating sensing measurements, and processing sensing measurements to fulfill a sensing goal. In some implementations, generation unit 526 may be responsible for receiving data transmissions and processing data transmissions to fulfill a data transfer goal. In some implementations, generation unit 526 may be configured to transmit sensing measurements to sensing decision unit 504 for further processing. In an implementation, generation unit 526 may be configured to cause at least one transmitting antenna of transmitting antenna(s) 514 to transmit messages to each of plurality of sensing transmitters 506-(1-M). Further, generation unit 526 may be configured to receive, via at least one receiving antenna of receiving antennas(s) 516, messages from each of plurality of sensing transmitters 506-(1-M).

In an implementation, RFE 518 and baseband processor 528 may realized a lower layer of the protocol stack, such as a physical (PHY) layer or a lower part of a MAC layer.

Referring again to FIG. 5, sensing decision unit 504 may realized an upper layer of protocol stack, such as a Media Access Control (MAC) layer, or an application layer. In an implementation, sensing decision unit 504 may include processor 528 and memory 530. For example, processor 528 and memory 530 of sensing decision unit 504 may be processor 114 and memory 116, respectively, as shown in FIG. 1. In an embodiment, sensing decision unit 504 may further include transmitting antenna(s) 532, receiving antenna(s) 534, CSI equalization unit 536, and group delay estimation and correction unit 538.

In some embodiments, an antenna may be used to both transmit and receive in a half-duplex format. When the antenna is transmitting, it may be referred to as transmitting antenna 532, and when the antenna is receiving, it may be referred to as receiving antenna 534. It is understood by a person of normal skill in the art that the same antenna may be transmitting antenna 532 in some instances and receiving antenna 534 in other instances. In the case of an antenna array, one or more antenna elements may be used to transmit or receive a signal, for example, in a beamforming environment. In some examples, a group of antenna elements used to transmit a composite signal may be referred to as transmitting antenna 532, and a group of antenna elements used to receive a composite signal may be referred to as receiving antenna 534. In some examples, each antenna is equipped with its own transmission and receive paths, which may be alternately switched to connect to the antenna depending on whether the antenna is operating as transmitting antenna 532 or receiving antenna 534.

In an implementation, CSI equalization unit 536 and group delay estimation and correction unit 538 may be coupled to processor 528 and memory 530. In some embodiments, CSI equalization unit 536 and group delay estimation and correction unit 538 amongst other units, may include routines, programs, objects, components, data structures, etc., which may perform particular tasks or implement particular abstract data types. CSI equalization unit 536 and group delay estimation and correction unit 538 may also be implemented as, signal processor(s), state machine(s), logic circuitries, and/or any other device or component that manipulate signals based on operational instructions.

In some embodiments, CSI equalization unit 536 and group delay estimation and correction unit 538 may be implemented in hardware, instructions executed by a processing unit, or by a combination thereof. The processing unit may comprise a computer, a processor, a state machine, a logic array or any other suitable devices capable of processing instructions. The processing unit may be a general-purpose processor that executes instructions to cause the general-purpose processor to perform the required tasks or, the processing unit may be dedicated to performing the required functions. In some embodiments, CSI equalization unit 536 and group delay estimation and correction unit 538 may be machine-readable instructions that, when executed by a processor/processing unit, perform any of desired functionalities. The machine-readable instructions may be stored on an electronic memory device, hard disk, optical disk, or other machine-readable storage medium or non-transitory medium. In an implementation, the machine-readable instructions may also be downloaded to the storage medium via a network connection. In an example, machine-readable instructions may be stored in memory 530.

According to an implementation, sensing decision unit 504 may be configured to perform CSI processing. The CSI processing may be performed by CSI equalization unit 536 and group delay estimation and correction unit 538. In an example, output from the logical CSI processing may be referred to as processed CSI (P-CSI). Further, in an example, the P-CSI may have undergone CSI equalization, or group delay estimation and correction, or both.

In an implementation, sensing transmitter 506-1 may include processor 540-1 and memory 542-1. For example, processor 540-1 and memory 542-1 of sensing transmitter 506-1 may be processor 114 and memory 116, respectively, as shown in FIG. 1. In an embodiment, sensing transmitter 506-1 may further include transmitting antenna(s) 544-1, receiving antenna(s) 546-1, transmitter front end (TFE) 548-1, and sensing agent 554-1. In an implementation, TFE 548-1 may include upconverter 550-1 and power amplifier 552-1.

In some embodiments, an antenna may be used to both transmit and receive in a half-duplex format. When the antenna is transmitting, it may be referred to as transmitting antenna 544-1, and when the antenna is receiving, it may be referred to as receiving antenna 546-1. It is understood by a person of normal skill in the art that the same antenna may be transmitting antenna 544-1 in some instances and receiving antenna 546-1 in other instances. In the case of an antenna array, one or more antenna elements may be used to transmit or receive a signal, for example, in a beamforming environment. In some examples, a group of antenna elements used to transmit a composite signal may be referred to as transmitting antenna 544-1, and a group of antenna elements used to receive a composite signal may be referred to as receiving antenna 546-1. In some examples, each antenna is equipped with its own transmission and receive paths, which may be alternately switched to connect to the antenna depending on whether the antenna is operating as transmitting antenna 544-1 or receiving antenna 546-1.

According to an implementation, upconverter 550-1 may be configured to convert a baseband signal to a radio frequency signal. In an example, upconverter 550-1 may shift the spectrum of the baseband signal to a desired radio frequency band. In an implementation, power amplifier 552-1 may be configured to increase magnitude of power of a given input signal.

In an implementation, sensing agent 554-1 may be a block that exchanges physical layer parameters and instructions between the MAC layer of sensing transmitter 506-1 and application layer programs or algorithms. Sensing agent 554-1 may be configured to cause at least one transmitting antenna of transmitting antenna(s) 544-1 and at least one receiving antenna of receiving antennas(s) 546-1 to exchange messages with receiving device 502.

Although receiving device 502, sensing decision unit 504 and sensing algorithm manager 508 are represented as separate devices in system 500, sensing decision unit 504 and sensing algorithm manager 508 may be considered as logical functional blocks and may reside on any devices that may support the features described herein. For example, receiving device 502 may incorporate the functionality of receiving device 502, sensing decision unit 504 and sensing algorithm manager 508. In another example, receiving device 502 and sensing decision unit 504 may be implemented on the same device and sensing algorithm manager 508 is implemented by a second, remote device. Where two functional blocks reside on the same device then the communication between the functional blocks may not require the transmission and reception of signals over the air via a transmitting antenna and a receiving antenna.

For ease of explanation and understanding, the description provided above is with reference to sensing transmitter 506-1, however, the description is equally applicable to remaining sensing transmitters 506-(2-M).

According to one or more implementations, communications in network 560 may be governed by one or more of the 802.11 family of standards developed by IEEE. Some example IEEE standards may include IEEE 802.11-2020, IEEE 802.11ax-2021, IEEE 802.11me, IEEE 802.11az and IEEE 802.11be. IEEE 802.11-2020 and IEEE 802.11ax-2021 are fully-ratified standards whilst IEEE 802.11me reflects an ongoing maintenance update to the IEEE 802.11-2020 standard and IEEE 802.11be defines the next generation of standard. IEEE 802.11az is an extension of the IEEE 802.11-2020 and IEEE 802.11ax-2021 standards which adds new functionality. In some implementations, communications may be governed by other standards (other or additional IEEE standards or other types of standards). In some embodiments, parts of network 560 which are not required by system 500 to be governed by one or more of the 802.11 family of standards may be implemented by an instance of any type of network, including wireless network or cellular network.

In an implementation, Wi-Fi sensing may be performed based on detecting perturbations in an OTA channel. OTA channel refers here to a propagation path of a signal between a transmitter antenna and a receiver antenna. Wi-Fi sensing may depend upon a transmitted signal, which is generated by a baseband transmitter, and a received signal, which is processed by a baseband receiver, to calculate the CSI. The path between the baseband transmitter and the baseband receiver may be referred to as a measured channel and, in an example, the measured channel is not equal to the OTA channel since it includes processing effects of both the baseband transmitter and baseband receiver. The baseband receiver may interchangeably be referred to as baseband processor. In an example, the CSI calculated at the baseband receiver may be referred to as measured CSI (M-CSI).

Referring back to FIG. 5, according to one or more implementations, for the purpose of Wi-Fi sensing, receiving device 502 may initiate a measurement campaign (or a Wi-Fi sensing session). In the measurement campaign, exchange of transmissions between receiving device 502 and plurality of sensing transmitters 506-(1-M) may occur. In an example, control of these transmissions may be with the MAC layer of the IEEE 802.11 stack. A representation of a propagation channel between a receiving device and a sensing transmitter is captured by a measure of Channel State Information (CSI).

According to an example implementation, receiving device 502 may initiate the measurement campaign via one or more sensing trigger messages. In an implementation, generation unit 526 may be configured to generate a sensing trigger message to trigger a response from each of plurality of sensing transmitters 506-(1-M). In examples, the sensing trigger message to each of plurality of sensing transmitters 506-(1-M) may differ in content. The response to the sensing trigger message may be a sensing transmission. In an example, a sensing trigger message may include a requested transmission configuration. Other examples of information/data included in the sensing trigger message that are not discussed here are contemplated herein. According to an implementation, generation unit 526 may transmit the sensing trigger message to each of plurality of sensing transmitters 506-(1-M). In an implementation, generation unit 526 may transmit the sensing trigger message to each of plurality of sensing transmitters 506-(1-M) via transmitting antenna 514.

According to an implementation, each of plurality of sensing transmitters 506-(1-M) may receive the sensing trigger message from receiving device 502. In response to receiving the sensing trigger message, each of plurality of sensing transmitters 506-(1-M) may generate a sensing transmission. In an implementation, each of plurality of sensing transmitters 506-(1-M) may generate the sensing transmission using the requested transmission configuration defined by the sensing trigger message. Subsequently, each of plurality of sensing transmitters 506-(1-M) may transmit the sensing transmission to receiving device 502 in response to the sensing trigger message and in accordance with the requested transmission configuration. In an example, the sensing transmission may include a delivered transmission configuration corresponding to the requested transmission configuration.

According to an implementation, receiving device 502 may receive sensing transmissions from plurality of sensing transmitters 506-(1-M) transmitted in response to the one or more sensing trigger messages. Receiving device 502 may be configured to receive the sensing transmissions from plurality of sensing transmitters 506-(1-M) via receiving antenna 516. According to an implementation, generation unit 526 may be configured to generate a sensing measurement representing a measured channel state information (M-CSI) based on the sensing transmissions.

C. Isolation of Electronic Environment for Improved Channel Estimation

The present disclosure generally relates to systems and methods for Wi-Fi sensing. In particular, the present disclosure relates to systems and methods for isolation of electronic environment for improved channel estimation.

Figure 6:
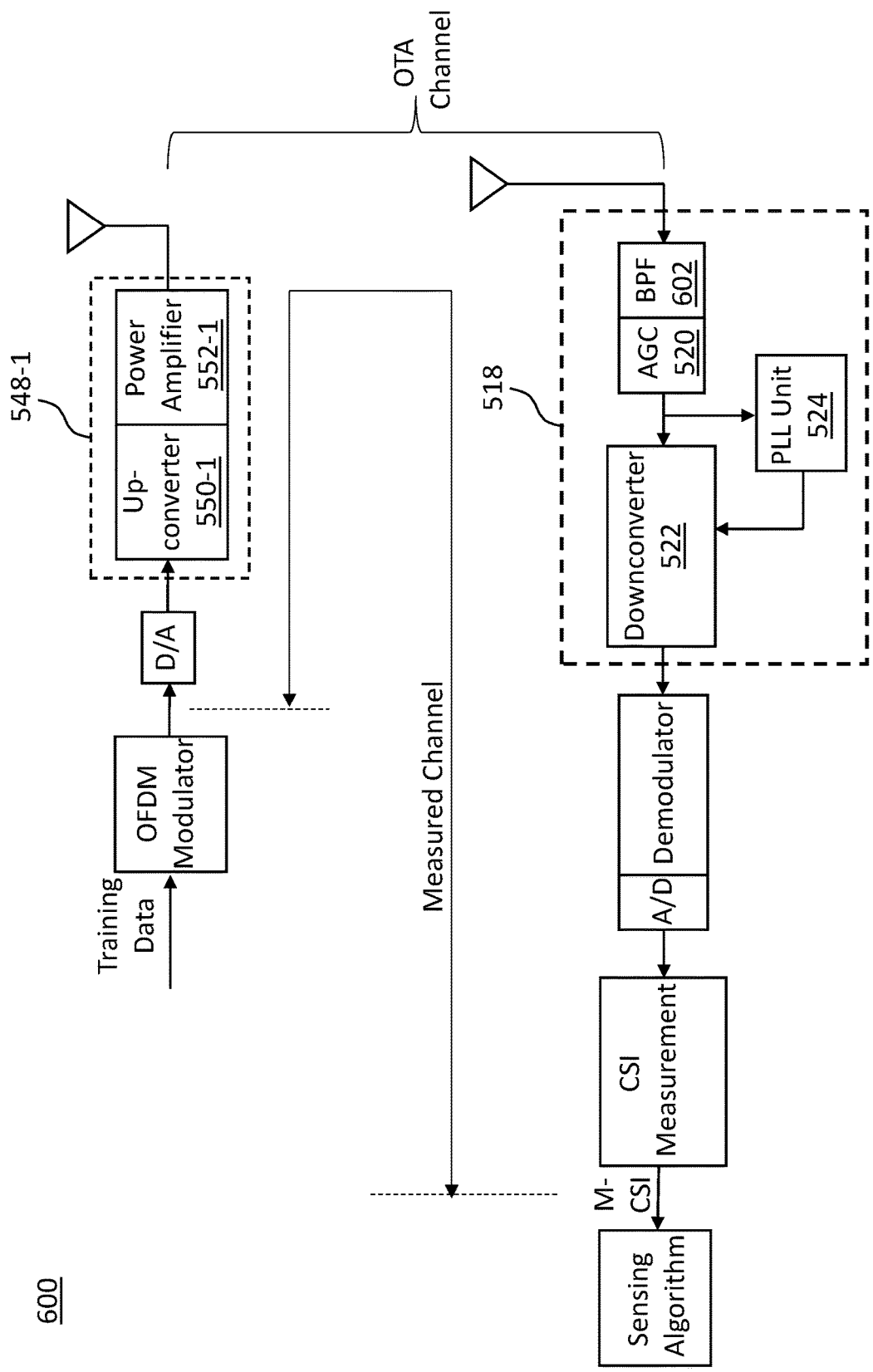
FIG. 6 depicts a measured channel versus an over the air (OTA) channel, according to some embodiments.

FIG. 6 depicts example 600 of a measured channel versus an OTA channel, according to some embodiments.

In an implementation, the CSI obtained through processing of the received signal at the baseband receiver includes effects of TFE 548-1 and RFE 518 in addition to the component of CSI of the OTA channel. Since the perturbations caused by the TFE 548-1 and the RFE 518 are not the result of an object in the sensing space, for accurate Wi-Fi sensing, the effect of CSI contributed by elements other than the OTA channel should be minimized.

As described in FIG. 6, TFE 548-1 may include upconverter 550-1 and power amplifier 552-1. Further, RFE 518 may include AGC 520, downconverter 522, PLL unit 524, and bandpass filter (BPF) 602. In an implementation, TFE 548-1 and RFE 518 may cause perturbations in the M-CSI.

In an implementation, the gain of AGC 520 may decrease when an input signal is strong, and increase when the input signal is weak. The gain of AGC 520 may interchangeably be referred to as AGC gain. The AGC gain may be applied equally across the whole frequency band of the input signal, minimizing gain distortion of the processed input signal. Accordingly, when a movement of an object occurs in the OTA channel, the AGC gain may vary uniformly (i.e., equally across all the whole frequency band) as strength of the input signal varies. As a result, magnitude of all the M-CSI tones may vary based on variation of the AGC gain. According to an implementation, the AGC gain may be sensitive to interfering signals that may arrive at an input port of AGC 520. For instance, a signal transmitted from a nearby device (for example, a device that may not be related to Wi-Fi sensing or a sensing goal) may reach the input port of AGC 520 as an interference together with a desired signal. In some examples where the interference is strong and the desired signal is weak, the signal-to-interference and noise ratio (SINR) may be low. In an implementation, AGC 520 may not differentiate between the interference and the desired signal. In an example, AGC 520 may treat the superposition of the strong interference and the weak signal as a strong input signal, and the AGC gain may be reduced to a low value. As a result, the weak desired signal may not be sufficiently amplified, and detection of small CSI changes due to movement of the object occurring in the OTA channel may become difficult, in particular when there are multiple transmitters located in the same vicinity.

In an implementation, when a signal is received and applied to the input port of AGC 520, magnitude of the signal is amplified by the AGC gain of AGC 520 that is set at that time. In situations where the AGC gain is not applied equally across the frequency band (for example, in case of a very wideband signal), gain distortion may be characterized across the frequency band and the AGC gain information may include multiple values each applicable to a portion of the received signal, where the multiple values may include values to cover the frequency band of the entire received signal. In an example, the multiple values may be calculated from an AGC gain mask which describes the frequency response of the AGC across a frequency band. In an example, the AGC gain mask consists of two or more values which scales a value of AGC gain according to a range of frequencies which are a subset of the frequency band. In an example, the ACG gain mask is stored by AGC 520 for the purposes of using in the described manner.

In an implementation, group delay is a characteristic of a physical channel or an element, for example, a filter. The group delay may represent phase shift amount of a signal caused by the channel or the element versus the frequency. In an example, group delay of an ideal channel, for example a distortion-free line-of-sight wireless orthogonal frequency division multiplexing (OFDM) channel or a distortion-free filter, is a straight line with a negative slope. However, for a non-ideal channel, the group delay of the M-CSI is not a straight line. Instead, the group delay of the M-CSI is a superposition of the group delays of all involved parts, including the group delay of the ideal OFDM channel, the group delay due to the real channel's distortion, and the group delay of non-ideal filters, and may have discontinuity. Before the M-CSI can be used for sensing, the group delay of the ideal OFDM channel needs to be estimated with sufficient accuracy.

Figure 7:
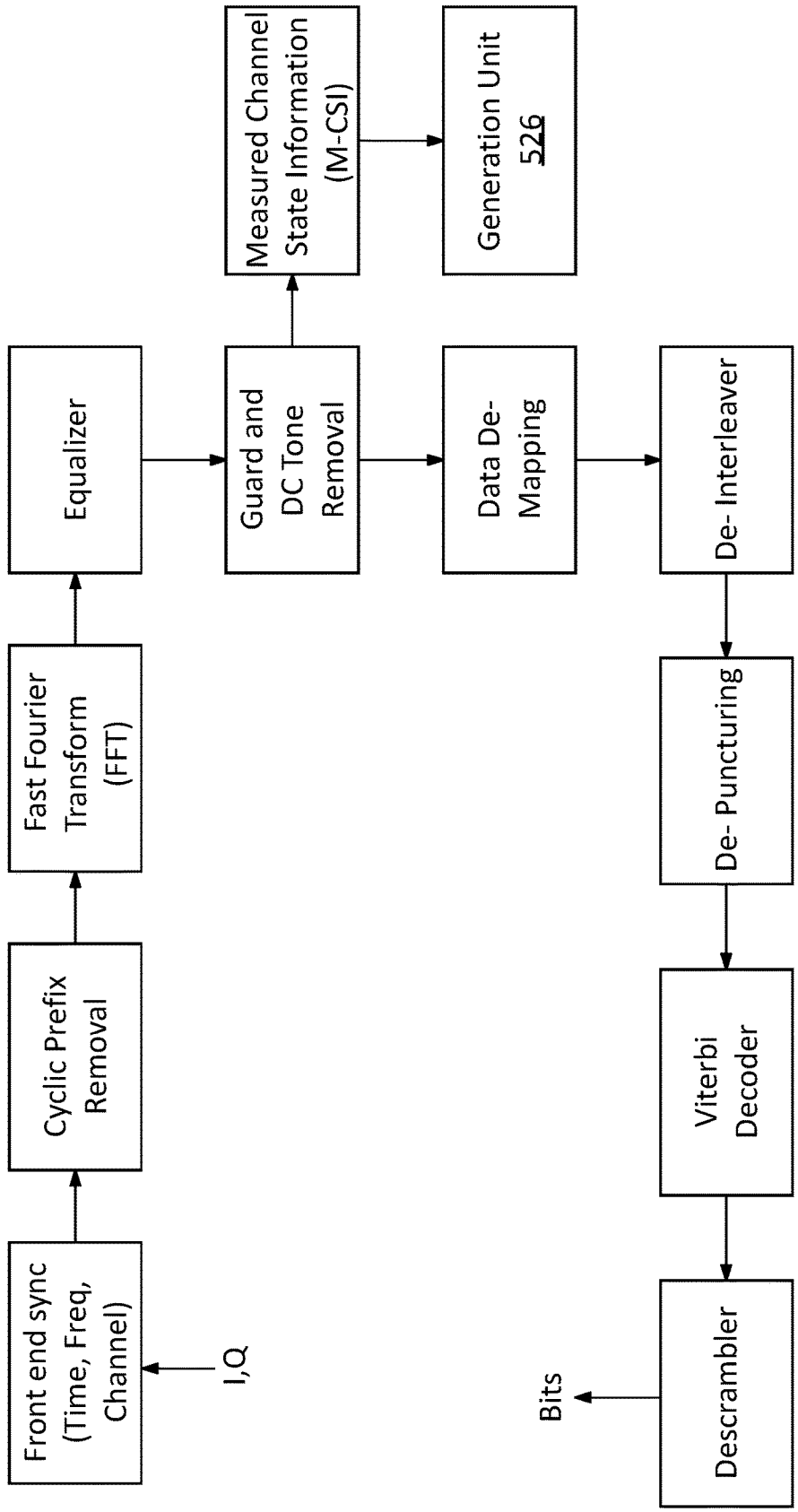
FIG. 7 depicts a representation of a receiver chain of a receiving device, according to some embodiments.

According to an implementation, baseband processor 528 of receiving device 502 may be configured perform CSI measurement to calculate M-CSI based on sensing transmissions received from plurality of sensing transmitters 506-(1-M). In some implementations, receiving device 502 may calculate a contribution to the M-CSI by RFE 518. In an example, RFE 518 may include analog elements and digital elements. For example, RFE 518 may include the analog and digital components through which a received signal may travel from a reference point to a point at which the received signal may be read by generation unit 526 of receiving device 502. A representation 700 of the receiver chain of receiving device 502 is illustrated in FIG. 7. As described in FIG. 7, In-phase (I) and Quadra phase (Q) modulated symbols arrive at a frond end of the receiver where synchronization is performed including frequency and timing recovery. Further, time domain guard period (cyclic prefix) is removed, and the receiver performs a Fast Fourier Transform (FFT) on the received signal (for example, the I and Q modulated symbols). Guard tones and DC tones are then removed. M-CSI is then generated prior to data de-mapping, de-interleaving (using a de-interleaver), de-puncturing, decoding (using a Viterbi decoder) and finally descrambling (using a descrambler). As a result of descrambling, data bits are generated. The generated M-CSI is provided to generation unit 526.

According to an implementation, the M-CSI is modeled as comprising two components: contribution of the physical channel between receiving device 502 and each of a plurality of sensing transmitters 506-(1-M), including features of interest in a sensing space, and contribution of RFE 518 of receiving device 502.

In an implementation, upon receiving the M-CSI, receiving device 502 may send the M-CSI to sensing decision unit 504. According to an implementation, receiving device 502 may also send receiver front end state information (RFE-SI) along with the M-CSI to sensing decision unit 504. In some implementations, baseband processor may send the M-CSI and the RFE-SI to sensing decision unit 504. In an example, the RFE-SI may include at least one of a phase variation indicator, automatic gain controller (AGC) information, and downconverter type information. Other examples of RFE-SI that are not discussed here are contemplated herein. In an implementation, the term "information" is used to equally capture signals and messages representing the aspects of RFE 518.

Figure 8:
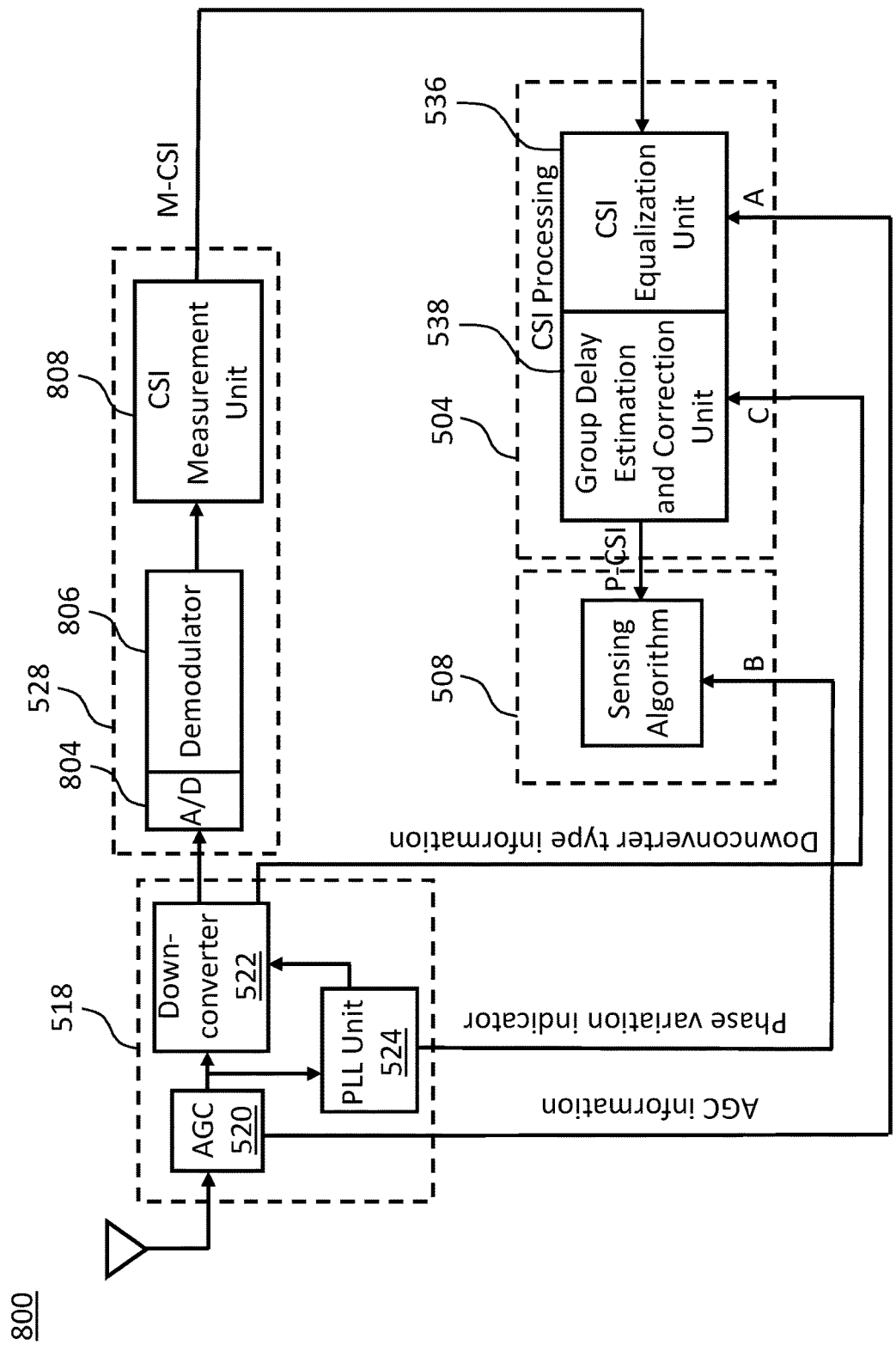
FIG. 8 depicts a receiver front end (RFE) perturbation correction architecture, according to some embodiments.

FIG. 8 depicts RFE perturbation correction architecture 800, according to some embodiments.

As described in FIG. 8, RFE perturbation correction architecture 800 includes RFE 518, baseband processor 528, sensing decision unit 504, and sensing algorithm manager 508. RFE 518 may include AGC 520, downconverter 522, and PLL unit 524. Further, baseband processor 528 may include analog-to-digital (A/D) converter 804, demodulator 806, and CSI measurement unit 808. Sensing decision unit 504 includes CSI equalization unit 536 and group delay estimation and correction unit 538. In an implementation, CSI equalization unit 536, group delay estimation and correction unit 538, and sensing algorithm manager 508 may facilitate CSI processing.

In an implementation, baseband processor 528 may perform a plurality of sensing measurements based on the CSI contributed by the physical channel between receiving device 502 and each of plurality of sensing transmitters 506-(1-M) and the CSI contributed by RFE 518 of receiving device 502. Baseband processor 528 may then output the M-CSI representing each sensing measurement. In an implementation, the M-CSI and the RFE-SI may be passed to sensing decision unit 504 via MLME interface or as a dedicated data transfer from application to application. As described in FIG. 8, the RFE-SI may include the AGC information (represented by arrow "A"), the phase variation indicator (represented by arrow "B"), and the downconverter type information (represented by arrow "C").

Although, it is shown in FIG. 8 that the AGC information, the phase variation indicator, and the downconverter type information bypasses baseband processor 528, in some implementations, the AGC information, the phase variation indicator, and the downconverter type information may be fed into baseband processor 528 by RFE 518, and baseband processor 528 may output the AGC information, the phase variation indicator, and the downconverter type information to sensing decision unit 504.

In an implementation, upon receiving the AGC information, an A/D converter of baseband processor 528 may convert the AGC information from an analog form to a digital form. In an implementation, the A/D converter may be A/D converter 804 of baseband processor 528. Baseband processor 528 may then pass the digital AGC information to sensing decision unit 504. Similarly, upon receiving the phase variation indicator, an A/D converter of baseband processor 528 may convert the phase variation indicator from an analog form to a digital form. In an implementation, the A/D converter may be the same A/D converter that converts the AGC information or it may be A/D converter 804 of baseband processor 528. Baseband processor 528 may then pass the digital phase variation indicator to sensing algorithm manager 508. Further, upon receiving the downconverter type information, an A/D converter of baseband processor 528 may convert the downconverter type information from an analog form to a digital form. In an implementation, the A/D converter may be the same A/D converter that converts the AGC information and phase variation indicator or it may be A/D converter 804 of baseband processor 528. Baseband processor 528 may then pass the digital downconverter type information to sensing decision unit 504.

According to an implementation, the RFE-SI may be provided as a message to sensing decision unit 504 and sensing algorithm manager 508 by baseband processor 528 of receiving device 502. In an example implementation, baseband processor 528 may provide the RFE-SI as a single message via the MLME and the SME. In an implementation, the RFE-SI may be provided as one or more digital signals to sensing decision unit 504 and sensing algorithm manager 508 by at least one of baseband processor 528 of receiving device 502 and RFE 518. In some implementations, the RFE-SI may be provided as one or more digital signals and one or more analog signals to sensing decision unit 504 and sensing algorithm manager 508 by at least one of baseband processor 528 of receiving device 502 and RFE 518. In an example, the RFE-SI may be provided on a frame by frame basis together with the M-CSI to sensing decision unit 504. In an implementation, the format of the signals and messages passed from RFE 518 and baseband processor 528 to sensing decision unit 504 and sensing algorithm manager 508 may be in a standard format.

Figure 9:
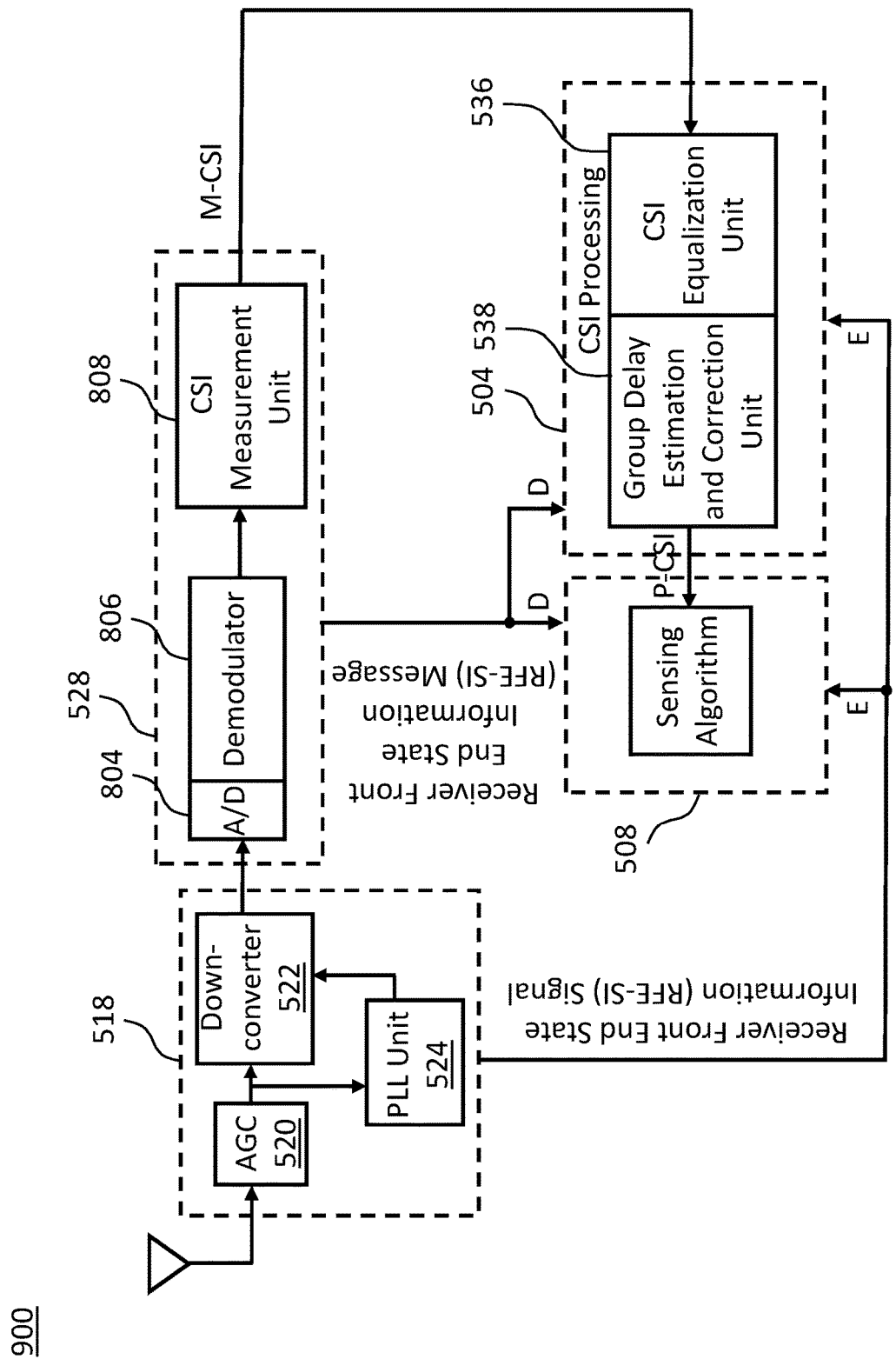
FIG. 9 depicts an example of receiver front end state information (RFE-SI) in the RFE perturbation correction architecture, according to some embodiments.

FIG. 9 depicts example 900 of RFE-SI in RFE perturbation correction architecture 800, according to some embodiments. As described in FIG. 9, the RFE-SI may be provided as an RFE-SI message (represented by arrow "D") to sensing decision unit 504 and sensing algorithm manager 508 by baseband processor 528. Further, the RFE-SI may be provided as an RFE-SI signal (represented by arrow "E") to sensing decision unit 504 and sensing algorithm manager 508 by RFE 518. In an implementation, either or both of the RFE-SI message and RFE-SI signal may be present at any time.

Figure 10:
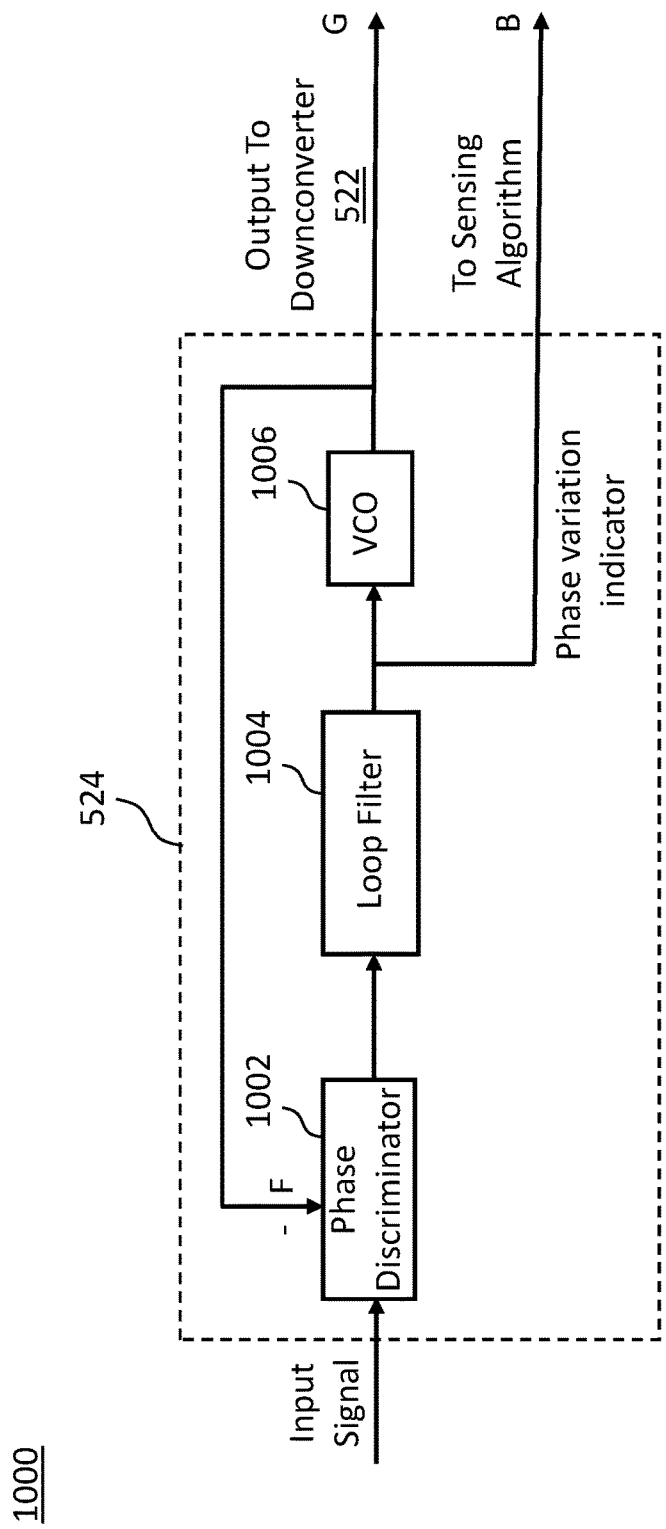
FIG. 10 depicts a structure of a phase locking loop (PLL) unit, according to some embodiments.

FIG. 10 depicts a structure 1000 of PLL unit 524, according to some embodiments.

As described in FIG. 10, PLL unit 524 may include phase discriminator 1002, loop filter 1004, and voltage controlled oscillator (VCO) 1006. In an example, phase discriminator 1002 may also be referred to interchangeable as phase comparator. In an example, loop filter 1004 may be a low pass filter. In an implementation, VCO 1006 may generate a sinusoidal waveform as its output. The sinusoidal waveform may be referred to as VCO output waveform. In an implementation, the VCO output waveform may be sent back to phase discriminator 1002 (represented by arrow "F"). The VCO output waveform may also be sent to downconverter 522 as an output (represented by arrow "G"). In an implementation, phase discriminator 1002 may compare phase of the VCO output waveform with phase of an input waveform to generate an output voltage which is proportional to the difference between the two phase inputs. Phase discriminator 1002 may pass the output voltage to loop filter 1004. In an implementation, loop filter 1004 may filter the output voltage to suppress high frequency components, such as interference, and leakage of the input waveform through phase discriminator 1002. The filtered output voltage may then be applied to VCO 1006 to control the frequency of VCO 1006. In an example, and since phase is an integral of frequency, the filtered output voltage applied to VCO 1006 may also control the phase of the VCO output waveform. In an example, a higher filtered output voltage produces a higher frequency of VCO 1006.

In an implementation, phase discriminator 1002, loop filter 1004, and VCO 1006 may create a phase negative feedback loop, which may pull the phase of the VCO output waveform to track the phase changes of the input waveform. In an implementation, when the phase negative feedback loop is in a locked state (i.e., synchronized), the VCO output waveform may have the same frequency and phase as the input waveform and so be synchronized to the input waveform.

In some examples, PLL unit 524 may be in an out-of-lock state (i.e., the phase negative feedback loop is not in a locked state) due to, for example, strong impulsive noise or interference, or an unstable power supply. In the out-of-lock state, the VCO output waveform provided to downconverter 522 may have a phase offset or phase drift (equivalent to a frequency offset), which may be reflected in the M-CSI as a distortion. This distortion in the M-CSI may be interpreted by the sensing algorithm as perturbations in the OTA channel, leading to false detection.

In an example, when PLL unit 524 is in the locked state, the output voltage applied to VCO 1006 may maintain a constant or near-constant value. On the contrary, when PLL unit 524 is in the out-of-lock state, the output voltage applied to VCO 1006 may vary more widely. Accordingly, the output voltage is an indicator of phase variations which may be present in the M-CSI due to VCO 1006. The output voltage may be referred to as phase variation indicator, and it is provided to the sensing algorithm.

In an example, the phase variation indicator may be an analog signal which may be digitized prior to being provided to the sensing algorithm. For example, an analog phase variation indicator may be input to baseband processor 528. In an implementation, baseband processor 528 may convert the analog phase variation indicator into digital phase variation indicator, and the digital phase variation indicator may be provided to the sensing algorithm. In some embodiments, PLL unit 524 may be a digital PLL, and the phase variation indicator may exist already in a digital form. Further, in some embodiments, sensing decision unit 504 may comprise an A/D converter which may convert an analog phase variation indicator to a digital signal. Accordingly, the voltage output from loop filter 1004 and applied to VCO 1006 may be provided to the sensing algorithm as a phase variation indicator. In an example, the phase variation indicator may indicate that PLL unit 524 is out-of-lock and in this case, the sensing algorithm may not consider the CSI changes to avoid false motion detection. In some implementations, the phase variation indicator may be filtered further prior to its use by sensing algorithm. In an example, the phase variation indicator may be low pass filtered to suppress high frequency variations which may be artifacts of other signal impairments.

Figure 11:
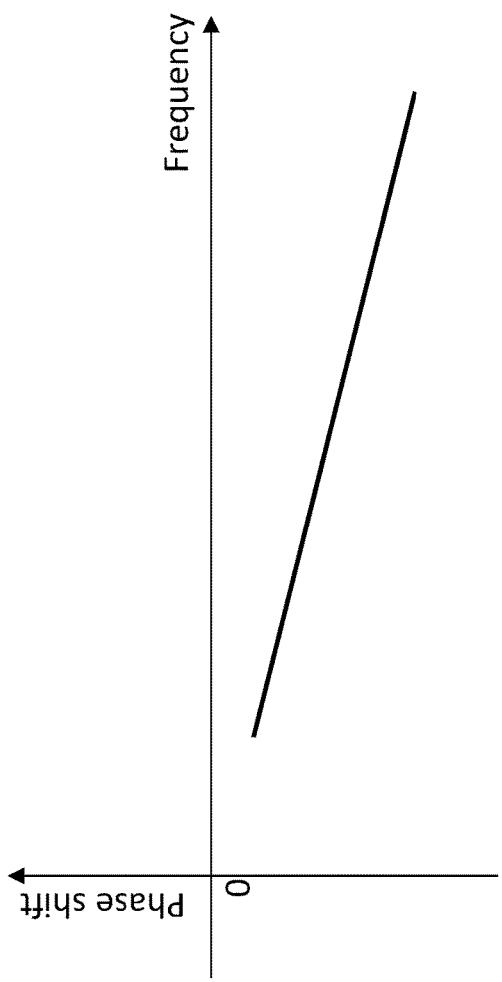
FIG. 11 depicts an example of group delay of an ideal channel, according to some embodiments.

A signal, such as a multi-tone OFDM signal, comprising a range of frequency components passing through an ideal system, such as an ideal channel or a ideal filter, experiences the same time delay across all frequency components. Accordingly, the phase shift of each frequency component may be proportional to the frequency of each frequency component. Example 1100 of group delay of an ideal channel such as a distortion-free channel (also referred to as distortion-free line of sight wireless OFDM channel) or a distortion-free filter is shown in FIG. 11. As described in FIG. 11, the group delay of the distortion-free channel is a straight line with a negative slope. In situations where the Wi-Fi channel is not ideal, the group delay of the M-CSI may not be as described by example 1100. In such situations, the group delay of the M-CSI may be a superposition of the group delays contributed by each signal processing element including the group delay of the ideal channel.

In an implementation, for the M-CSI to be used for motion sensing, the group delay of the channel may need to be estimated with sufficient accuracy. However, the group delay of the M-CSI may include the group delay of filters used in downconverter 522, and the nature or form of the group delay of filters used in downconverter 522 may depend on the type of downconverter 522 implemented (i.e., whether downconverter 522 is a low-IF downconverter or a zero-IF downconverter).

According to an implementation, a radio frequency signal may be mathematically expressed using equation (8), provided below.

$$r(t)=\text{Real}\{[I(t)-jQ(t)]e^{j2\pi f_c t}\}=I(t)\cos(2\pi f_c t)+Q(t)\sin(2\pi f_c t) \quad (8)$$

where, Real{x} represents a real part of a complex number x, $j=\sqrt{-1}$, $f_c$ represents carrier frequency, I(t) represents an in-phase component of a baseband signal, and Q(t) represents a quadrature component of the baseband signal. In an implementation, downconverter 522 may be configured to recover the in-phase, I(t), and quadrature, Q(t), components from the received radio frequency signal.

Figure 12:
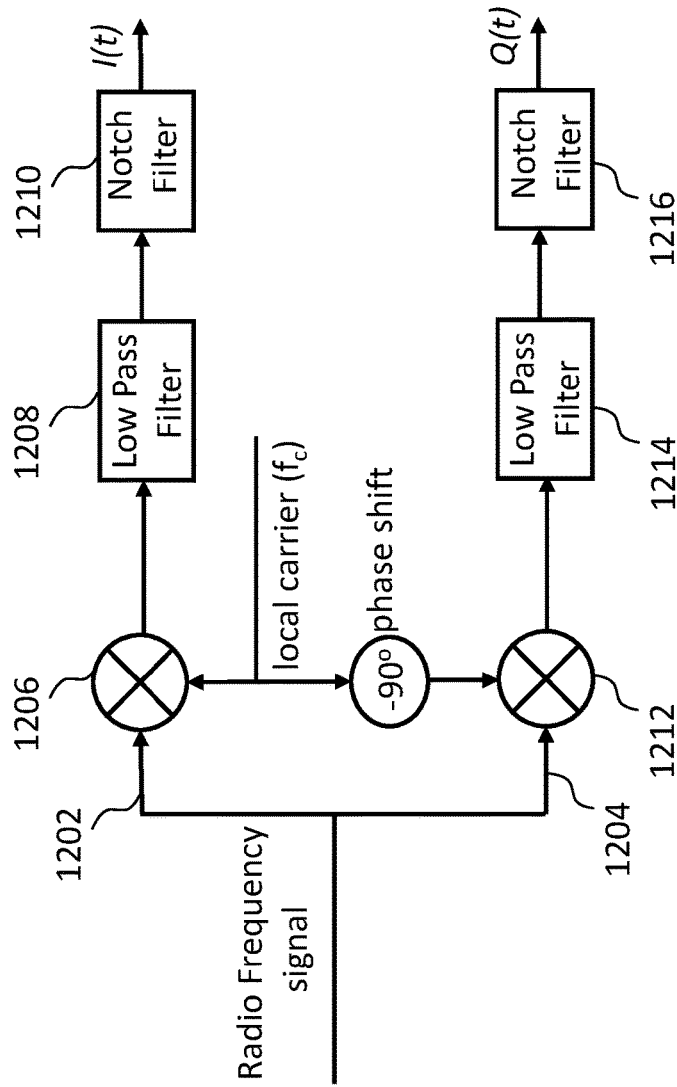
FIG. 12 depicts a block diagram of zero-intermediate frequency (zero-IF) downconverter with two branches, according to some embodiments.

FIG. 12 depicts a block diagram of zero-IF downconverter 1200 with two branches, according to some embodiments.

In an implementation, zero-IF downconverter 1200 may be a downconverter with a single frequency mixer stage for converting a received radio frequency signal into a baseband signal in a single step. In an example, the radio frequency signal may be received by receiving antenna 516 of receiving device 502. As described in FIG. 12, zero-IF downconverter 1200 may include two branches, namely first branch 1202 and second branch 1204. Also, as described in FIG. 12, outputs of first branch 1202 and second branch 1204 are in-phase I(t) and quadrature Q(t) baseband signals, respectively. First branch 1202 may include first frequency mixer 1206, first low pass filter 1208, and first notch filter 1210. In an implementation, first frequency mixer 1206 may be a non-linear device which multiplies the radio frequency signal with a local carrier, $f_c$, whose frequency and phase are synchronized with the radio frequency signal. In an example, the local carrier, $f_c$, is generated by PLL unit 524. According to an implementation, output of first frequency mixer 1206 may include the baseband signal, a high frequency component, and a direct current (DC) component. In an example, amongst these components, only the baseband signal is useful and is the desired signal. The undesired high frequency component may be suppressed (or attenuated) by first low pass filter 1208 and the DC component may be suppressed by first notch filter 1210. Further, second branch 1204 may include second frequency mixer 1212, second low pass filter 1214, and second notch filter 1216.

According to aspects of the present disclosure, description of first branch 1202, first frequency mixer 1206, first low pass filter 1208, and first notch filter 1210 is equally applicable to second branch 1204, second frequency mixer 1212, second low pass filter 1214, and second notch filter 1216, respectively.

Figures 13A, 13B:
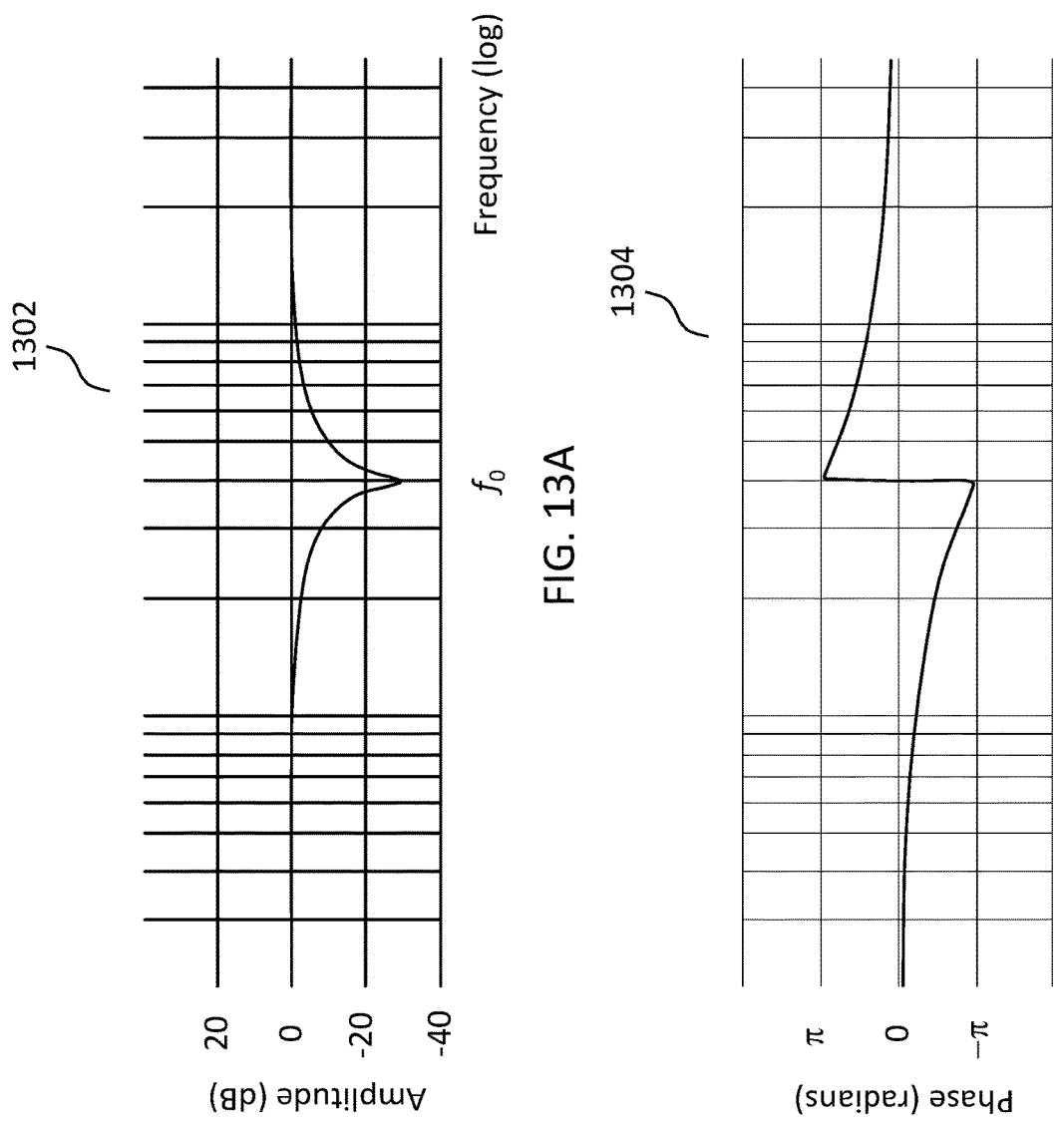
FIG. 13A and FIG. 13B depict characteristics of an example of a notch filter, according to some embodiments.

In an implementation, a notch filter may be a type of band stop filter that may attenuate frequencies within a specific range while passing all other frequencies without attenuation (or with minimal attenuation). FIG. 13A and FIG. 13B depict characteristics of an example of a notch filter, according to some embodiments. In FIG. 13A, plot 1302 shows amplitude versus frequency of the notch filter (clearly demonstrating the frequency-selective attenuation). In FIG. 13B, plot 1304 shows phase shift versus frequency of the notch filter (i.e., the group delay). It is shown that the group delay has a phase discontinuity (i.e., a phase jump) at center frequency $f_0$ of the notch filter.

According to an implementation, the group delay of the output of the notch filter may have a phase discontinuity at the middle of the frequency band. For instance, for a 20 MHz band comprising 52 subcarriers, the group delay may have a discontinuity between the $26^{th}$ and $27^{th}$ subcarriers. In an implementation, to accurately estimate the group delay from the M-CSI, the effect of this discontinuity is removed. To this end, tones of the M-CSI may be divided into two sets, each set being independently processed to yield an estimation of the group delay while avoiding the discontinuity. For example, for the 20 MHz band comprising 52 subcarriers, the group delay of the first 26 tones of the M-CSI and the group delay of the second 26 tones of the M-CSI may be separately and independently estimated to yield two components of the estimated group delay. As a result, the effect of the phase discontinuity caused by the notch filter may be avoided during the estimation. In an implementation, after the two components of the group delay are estimated separately, the discontinuity of the group delay may be corrected or removed by further processing and in some implementations, a single group delay mitigating the discontinuity caused by notch filter 1210 or notch filter 1216 may be calculated.

Figure 14:
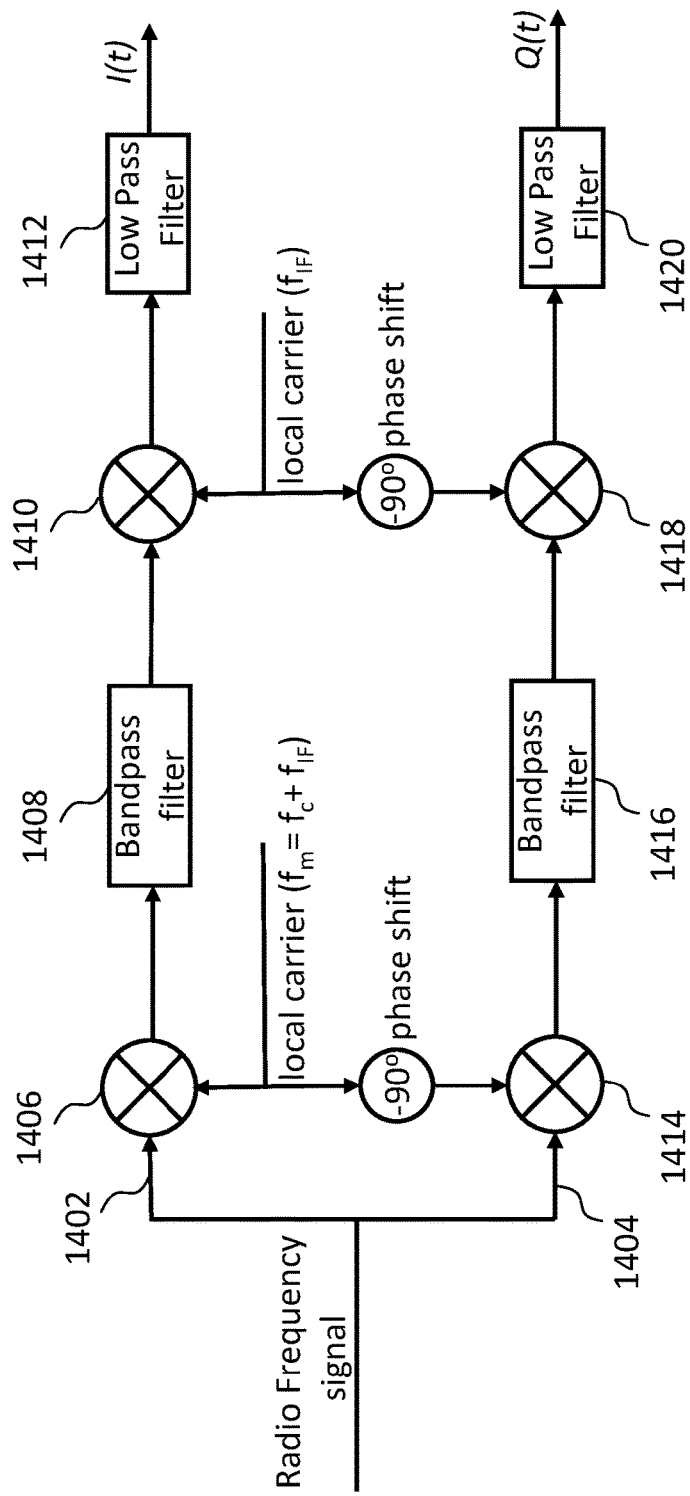
FIG. 14 depicts a block diagram of two-stage low-IF downconverter with two branches, according to some embodiments

FIG. 14 depicts a block diagram of two-stage low-IF downconverter 1400 with two branches, according to some embodiments.

In an implementation, two-stage low-IF downconverter 1400 may be a downconverter with two stages of frequency mixers, namely a first stage and a second stage. The first stage may convert a received radio frequency signal into a low IF signal, where a bandpass filter may allow only the desired IF signal to pass. Further, the bandpass filter may attenuate all other undesired lower and higher frequency components. The second stage may convert the IF signal to a baseband signal. As described in FIG. 14, low-IF downconverter 1400 may include two branches, namely first branch 1402 and second branch 1404 and the outputs of first branch 1402 and second branch 1404 are in-phase I(t) and quadrature Q(t) baseband signals, respectively. First branch 1402 may include first frequency mixer 1406, first bandpass filter 1408, second frequency mixer 1410, and first low pass filter 1412. Further, second branch 1404 may include third frequency mixer 1414, second bandpass filter 1416, fourth frequency mixer 1418, and second low pass filter 1420.

In an implementation of low-IF downconverter 1400, the resultant baseband signal in each of first branch 1402 and second branch 1404 branch may not include a DC component. Accordingly, notch filter may not be required by low-IF downconverter 1400 and, as a result, the group delay of the M-CSI may not have a discontinuity within its frequency band.

Referring again to FIG. 5, in an implementation, sensing decision unit 504 may be configured to receive the M-CSI representing the sensing measurement from receiving device 502. Further, sensing decision unit 504 may be configured to receive the RFE-SI from receiving device 502. In an example implementation, sensing decision unit 504 may receive the M-CSI and the RFE-SI from receiving device 502 via receiving antenna 534. In an implementation, sensing decision unit 504 may receive the M-CSI via the MLME and the SME.

According to an implementation, upon receiving the M-CSI and the RFE-SI, sensing decision unit 504 may be configured to remove or reduce the effect of the perturbations caused by RFE 518 in the M-CSI on sensing decision. In an implementation, sensing decision unit 504 may determine sensing decision input information according to the M-CSI and the RFE-SI. In an example, the sensing decision input information may include processed channel state information (P-CSI).

According to some implementations, CSI equalization unit 536 may determine whether the phase variation indicator indicates phase variation in the M-CSI. In response to determining that the phase variation indicator indicates phase variation in the M-CSI, CSI equalization unit 536 may set the sensing decision input information to a null input. In an example, CSI equalization unit 536 may discard the M-CSI and may not pass the M-CSI further, for example, to sensing algorithm manager 508.

According to some implementations, CSI equalization unit 536 may be configured to determine the AGC gain that AGC 520 applied to the sensing transmissions captured in the M-CSI from the AGC information to perform equalization of the M-CSI. In examples, the AGC information may be equivalent to the AGC gain that AGC 520 applied to the sensing transmissions. In some implementations, CSI equalization unit 536 may perform equalization of the M-CSI based on both the AGC information and the strength of the M-CSI. In an example, the strength of all or a portion of the M-CSI may be represented by a root-mean-square value of magnitudes of all or a portion of tones of the M-CSI.

In an implementation, CSI equalization unit 536 may make a first determination whether the AGC information exceeds a first threshold. In an implementation, CSI equalization unit 536 may be configured to make a second determination whether the strength of the portion of the M-CSI exceeds a second threshold. In response to determining that the AGC information does not exceed the first threshold and the strength of the portion of the M-CSI does not exceed the second threshold, CSI equalization unit 536 may perform a gain adjustment on the M-CSI. In an implementation, CSI equalization unit 536 may perform the gain adjustment by multiplying the M-CSI or portions of the M-CSI by an AGC scaling factor. This operation generates P-CSI. According to an implementation, CSI equalization unit 536 may set the sensing decision input information to the P-CSI.

In an implementation, CSI equalization unit 536 may multiply magnitudes of all M-CSI tones by the AGC scaling factor to apply gain to all or a portion of M-CSI tones provided by baseband processor 528. In an example, CSI equalization unit 536 may multiply the magnitudes of all or a portion of M-CSI tones provided by baseband processor 528 by an AGC scaling factor that is proportional to the inverse of the AGC information to create the P-CSI. In an implementation, CSI equalization unit 536 may determine the P-CSI using equation (9), provided below.

$$AGC_{scale} = \frac{a}{AGC \text{ information}} + b \qquad (9)$$

where, $AGC_{scale}$ is the AGC scaling factor, a is a multiplier, and b is an offset.

In some implementations, CSI equalization unit 536 may be configured to filter the AGC information using a low pass filter prior to making the first determination and the second determination.

According to some implementations, a determination that the AGC information does not exceed the first threshold may indicate that RFE 518 was largely saturated with an interferer resulting in a significant reduction in the AGC gain and the possibility that the resolution of the perturbations of the signal (as passed to A/D converter 804 of baseband processor 528) may be very low because the interfering signal dominates the available A/D resolution. In such situation, even if subsequently multiplied by CSI equalization unit 536, the precision of the resulting measurement may be inadequate for performing Wi-Fi sensing. In an example, CSI equalization unit 536 may set the sensing decision input information to a null input responsive to a determination that the AGC information does not exceed the first threshold or, in another example, may discard the M-CSI and not pass the M-CSI further, for example, to sensing algorithm manager 508.

According to some implementations, CSI equalization unit 536 may set the sensing decision input information to the M-CSI responsive to the first determination that the AGC information exceeds the first threshold and the second determination that the root-mean-square of the portion of the M-CSI exceeds the second threshold.

In an implementation, CSI equalization unit 536 may calculate the strength of relevant tones of the M-CSI. In an example relevant tones of the M-CSI may be the tones of the M-CSI that correspond to a sensing transmission from sensing transmitter 506-(1-M) received by receiving device 502. In an example the relevant tones of the M-CSI may be a subset of or a portion of all tones of the M-CSI. If the strength of relevant tones of the M-CSI is below a second threshold, CSI equalization unit 536 may create the P-CSI by multiplying the magnitudes of relevant tones of the M-CSI tones by the AGC scaling factor determined according to equation (9). In some implementations, if the AGC information is below the first threshold however the strength of the relevant tones of the M-CSI is greater than the second threshold, the M-CSI may not be strong enough for detection of objects movement. Accordingly, CSI equalization unit 536 may set the P-CSI to equal the M-CSI, and the P-CSI may be considered to be equivalent to the M-CSI. In an implementation, the setting of the P-CSI to the M-CSI corresponding to low AGC gain may facilitate in improving the detectability of the object's movement.

According to an implementation, group delay estimation and correction unit 538 may calculate a group delay of the M-CSI according to the downconverter type information. In an implementation, group delay estimation and correction unit 538 may process all tones of the M-CSI together as a single piece of information. In an implementation, group delay estimation and correction unit 538 may generate P-CSI by adjusting the M-CSI according to the downconverter type information. Further, group delay estimation and correction unit 538 may set the sensing decision input information to the P-CSI.

In an implementation, group delay estimation and correction unit 538 may determine whether downconverter 522 is a zero-IF downconverter or a low-IF downconverter. In response to determining that downconverter 522 is a zero-IF downconverter, group delay estimation and correction unit 538 may calculate the group delay on lower and upper portions of the signal bandwidth independently and combine the individual calculations of group delay. Further, group delay estimation and correction unit 538 may generate the P-CSI according to the combined individual calculations of group delay. Further, in response to determining that downconverter 522 is a low-IF downconverter, group delay estimation and correction unit 538 may calculate the group delay on the entire signal bandwidth. Further, group delay estimation and correction unit 538 may generate the P-CSI according to the calculated group delay. In examples, in response to determining that downconverter 522 is a low-IF downconverter, group delay estimation and correction unit 538 may carry out no processing on the signal and generate P-CSI without any estimate of group delay.

According to an implementation, sensing decision unit 504 may be configured to send the sensing decision input information (i.e., the P-CSI) to sensing algorithm manager 508 for making sensing decisions. In an example implementation, sensing decision unit 504 may send the sensing decision input information to sensing algorithm manager 508 via transmitting antenna 532.

Figure 15:
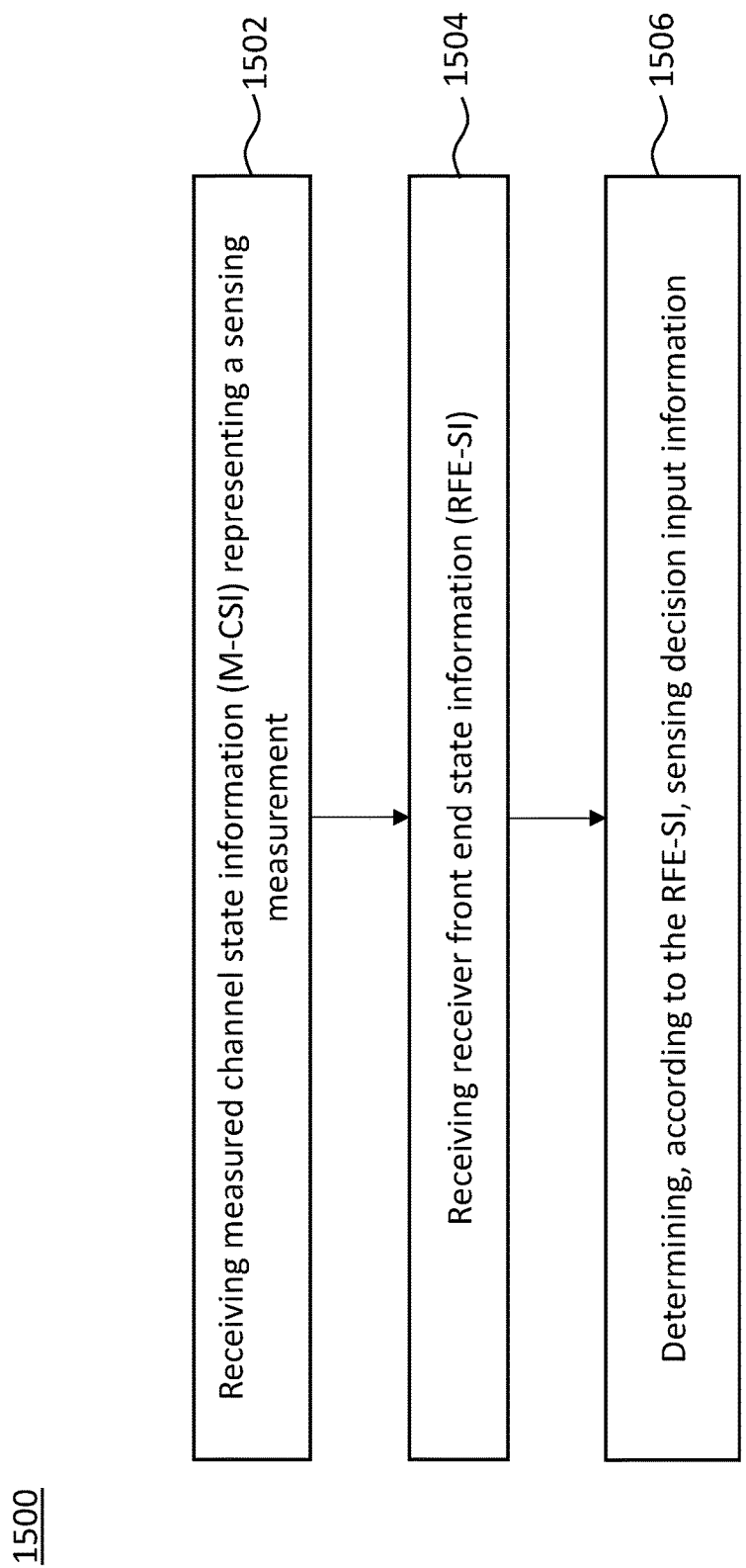
FIG. 15 depicts a flowchart for determining sensing decision input information, according to some embodiments.

FIG. 15 depicts flowchart 1500 for determining sensing decision input information, according to some embodiments.

In a brief overview of an implementation of flowchart 1500, at step 1502, M-CSI representing a sensing measurement is received. At step 1504, RFE-SI is received. At step 1506, sensing decision input information is determined according to the RFE-SI.

Step 1502 includes receiving M-CSI representing a sensing measurement. According to an implementation, sensing decision unit 504 may be configured to receive the M-CSI representing the sensing measurement from receiving device 502.

Step 1504 includes receiving RFE-SI. According to an implementation, sensing decision unit 504 may be configured to receive the RFE-SI from receiving device 502. In an example, the RFE-SI may include at least one of a phase variation indicator, automatic gain controller (AGC) information, and downconverter type information. In an implementation, sensing decision unit 504 may receive the RFE-SI as a message by baseband processor 528 of receiving device 502. In some implementations, sensing decision unit 504 may receive the RFE-SI as one or more digital signals by at least one of baseband processor 528 of receiving device 502 and RFE 518. In some implementations, sensing decision unit 504 may receive the RFE-SI as one or more digital signals and one or more analog signals by at least one of baseband processor 528 of receiving device 502 and RFE 518.

Step 1506 includes determining, according to the RFE-SI, sensing decision input information. According to an implementation, sensing decision unit 504 may be configured to determine the sensing decision input information according to the RFE-SI.

Figure 16:
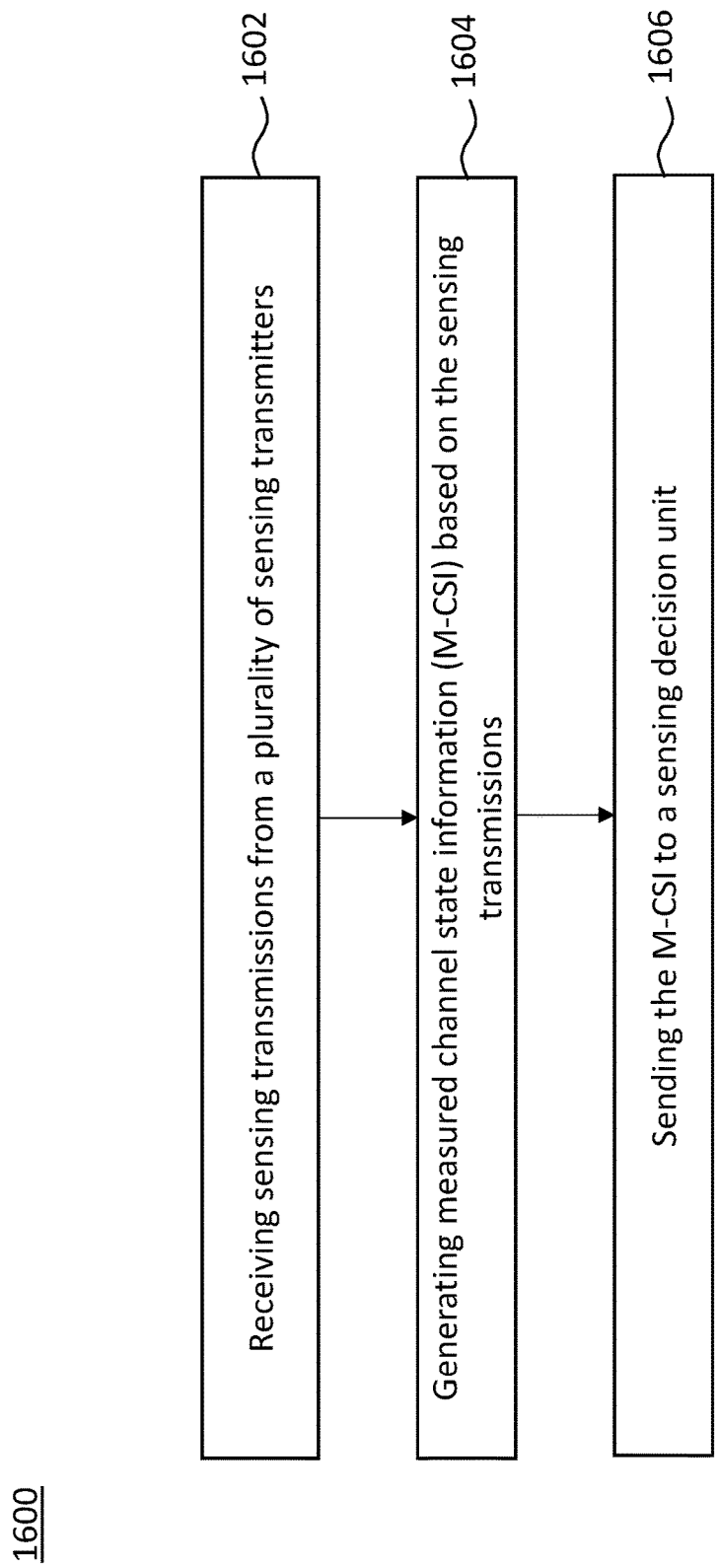
FIG. 16 depicts a flowchart for sending measured channel state information to a sensing decision unit, according to some embodiments.

FIG. 16 depicts flowchart 1600 for sending M-CSI to sensing decision unit 504, according to some embodiments.

In a brief overview of an implementation of flowchart 1600, at step 1602, sensing transmissions are received from plurality of sensing transmitters 506-(1-M). At step 1604, M-CSI is generated based on the sensing transmissions. At step 1606, the M-CSI is sent to sensing decision unit 504.

Step 1602 includes receiving sensing transmissions from plurality of sensing transmitters 506-(1-M). According to an implementation, receiving device 502 may be configured to receive sensing transmissions from plurality of sensing transmitters 506-(1-M).

Step 1604 includes generating M-CSI based on the sensing transmissions. According to an implementation, receiving device 502 may be configured to generate the M-CSI based on the sensing transmissions.

Step 1606 includes sending the M-CSI to sensing decision unit 504. According to an implementation, receiving device 502 may be configured to send the M-CSI to sensing decision unit 504.

Figure 17:
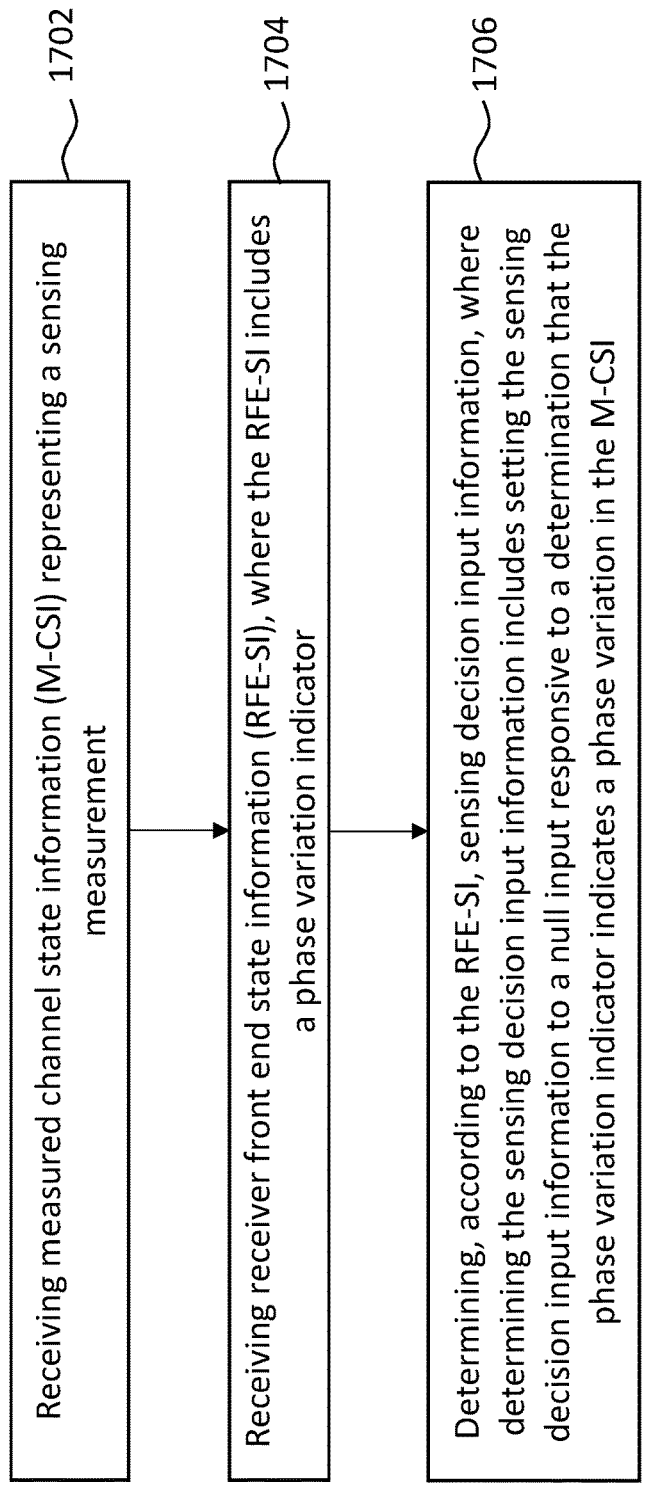
FIG. 17 depicts a flowchart for determining sensing decision input information according to RFE-SI, where the RFE-SI includes a phase variation indicator, according to some embodiments.

FIG. 17 depicts flowchart 1700 for determining sensing decision input information according to RFE-SI, where the RFE-SI includes a phase variation indicator, according to some embodiments.

In a brief overview of an implementation of flowchart 1700, at step 1702, M-CSI representing a sensing measurement is received. At step 1704, RFE-SI is received, where the RFE-SI includes a phase variation indicator. At step 1706, sensing decision input information is determined according to the RFE-SI, where determining the sensing decision input information includes setting the sensing decision input information to a null input responsive to a determination that the phase variation indicator indicates a phase variation in the M-CSI.

Step 1702 includes receiving M-CSI representing a sensing measurement. According to an implementation, sensing decision unit 504 may be configured to receive the M-CSI representing the sensing measurement from receiving device 502.

Step 1704 includes receiving RFE-SI, where the RFE-SI includes a phase variation indicator. According to an implementation, sensing decision unit 504 may be configured to receive the RFE-SI from receiving device 502. In an example, the RFE-SI may include the phase variation indicator.

Step 1706 includes determining, according to the RFE-SI, sensing decision input information, where determining the sensing decision input information includes setting the sensing decision input information to a null input responsive to a determination that the phase variation indicator indicates a phase variation in the M-CSI. According to an implementation, sensing decision unit 504 may be configured to determine whether the phase variation indicator indicates a phase variation in the M-CSI. Responsive to the determination that the phase variation indicator indicates the phase variation in the M-CSI, sensing decision unit 504 may sett the sensing decision input information to the null input.

Figure 18:
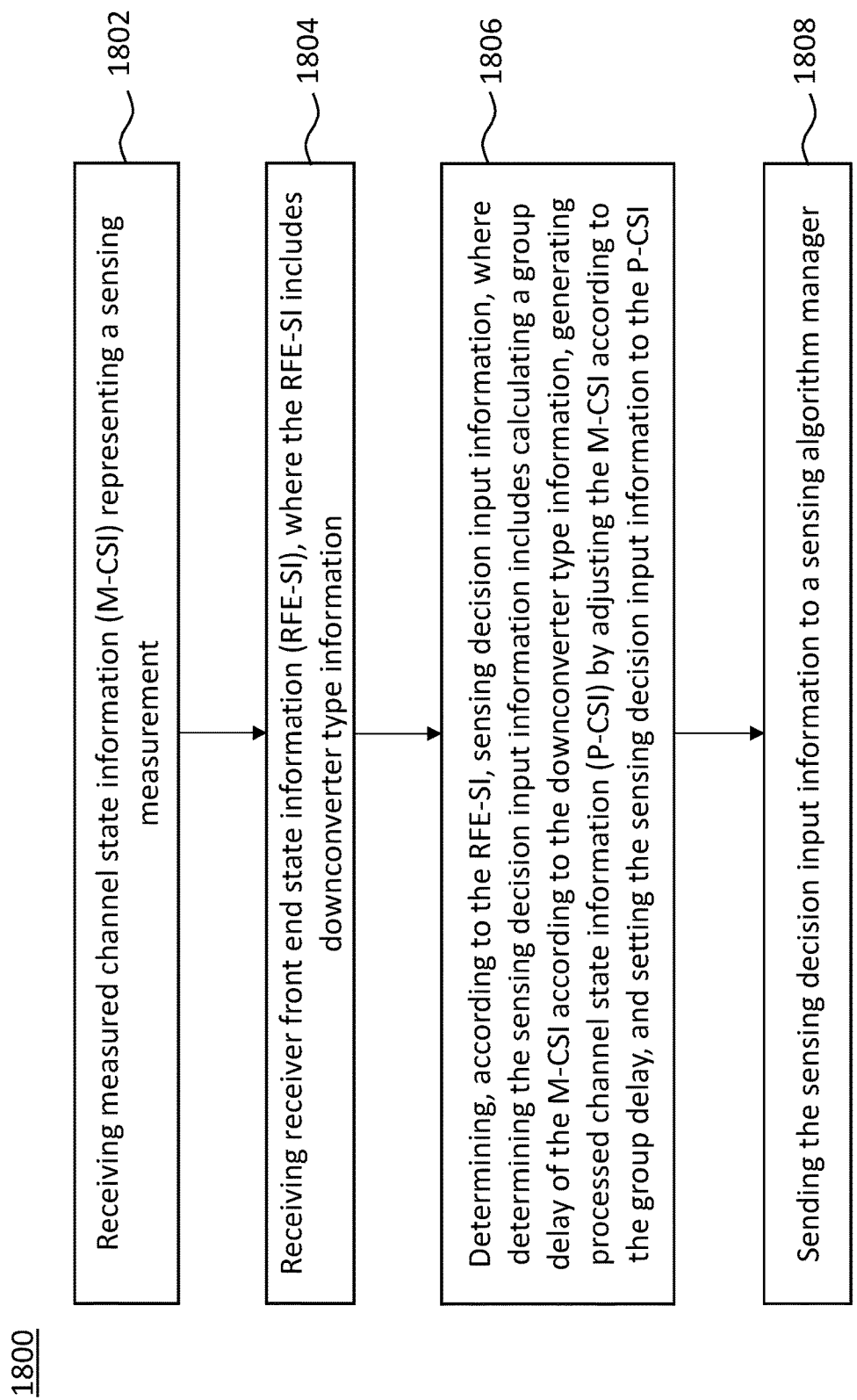
FIG. 18 depicts a flowchart for determining sensing decision input information according to RFE-SI, where the RFE-SI includes downconverter type information, according to some embodiments.

FIG. 18 depicts flowchart 1800 for determining sensing decision input information according to RFE-SI, where the RFE-SI includes downconverter type information, according to some embodiments.

In a brief overview of an implementation of flowchart 1800, at step 1802, M-CSI representing a sensing measurement is received. At step 1804, RFE-SI is received, where the RFE-SI includes downconverter type information. At step 1806, sensing decision input information is determined according to the RFE-SI, where determining the sensing decision input information includes calculating a group delay of the M-CSI according to the downconverter type information, generating P-CSI by adjusting the M-CSI according to the group delay, and setting the sensing decision input information to the P-CSI. At step 1808, the sensing decision input information is sent to sensing algorithm manager 508.

Step 1802 includes receiving M-CSI representing a sensing measurement. According to an implementation, sensing decision unit 504 may be configured to receive the M-CSI representing the sensing measurement from receiving device 502.

Step 1804 includes receiving RFE-SI, where the RFE-SI includes downconverter type information. According to an implementation, sensing decision unit 504 may be configured to receive the RFE-SI from receiving device 502. In an example, the RFE-SI may include the downconverter type information.

Step 1806 includes determining, according to the RFE-SI, sensing decision input information, where determining the sensing decision input information includes calculating a group delay of the M-CSI according to the downconverter type information, generating P-CSI by adjusting the M-CSI according to the group delay, and setting the sensing decision input information to the P-CSI. According to an implementation, sensing decision unit 504 may be configured to determine the sensing decision input information based on calculating a group delay of the M-CSI according to the downconverter type information, generating P-CSI by adjusting the M-CSI according to the group delay, and setting the sensing decision input information to the P-CSI.

Step 1808 includes sending the sensing decision input information to sensing algorithm manager 508. According to an implementation, sensing decision unit 504 may be configured to send the the sensing decision input information to sensing algorithm manager 508.

Figure 19A:
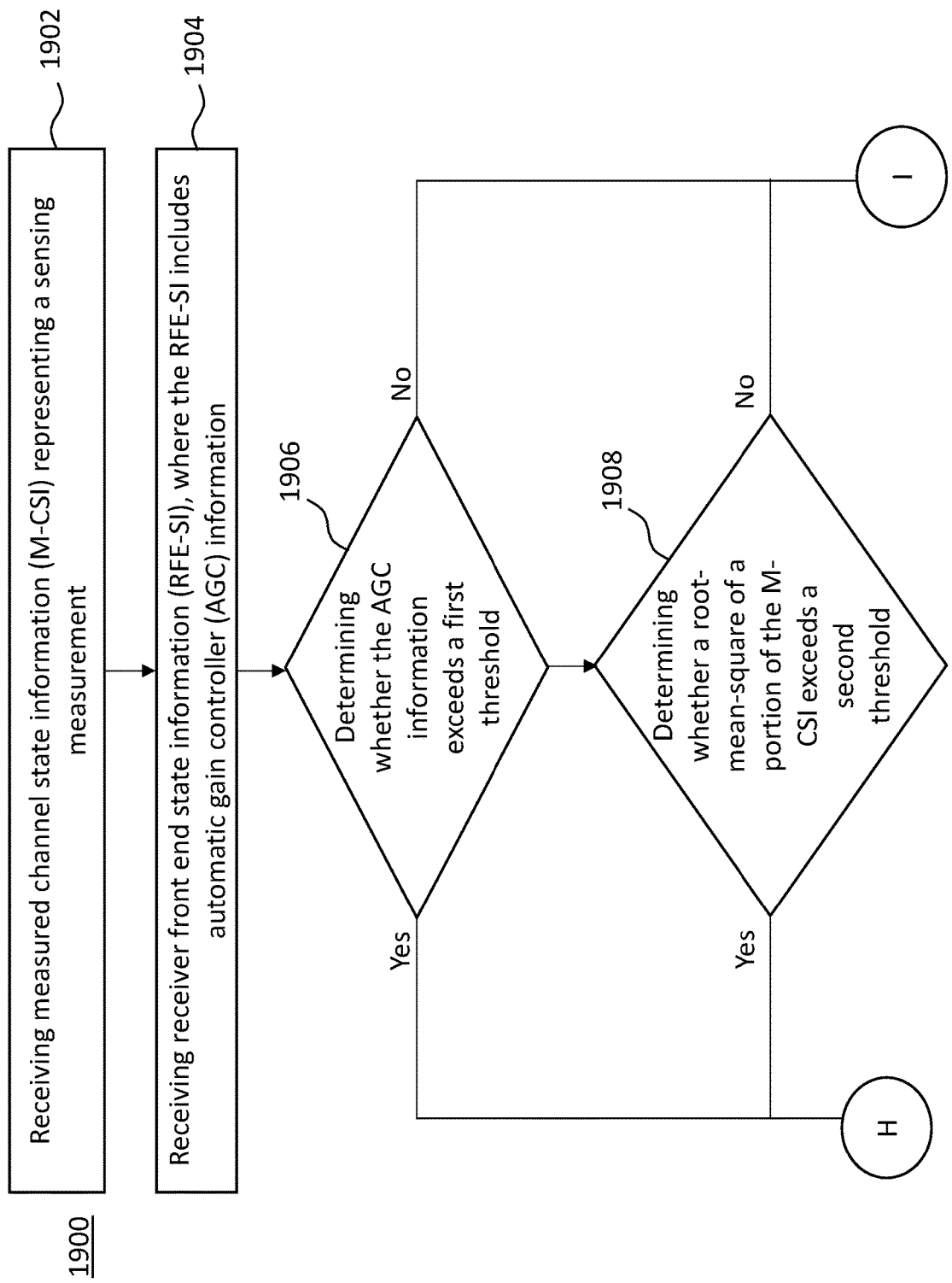
FIG. 19A and FIG. 19B depict a flowchart for determining sensing decision input information according to RFE-SI, where the RFE-SI includes automatic gain controller (AGC) information, according to some embodiments.
Figure 19B:
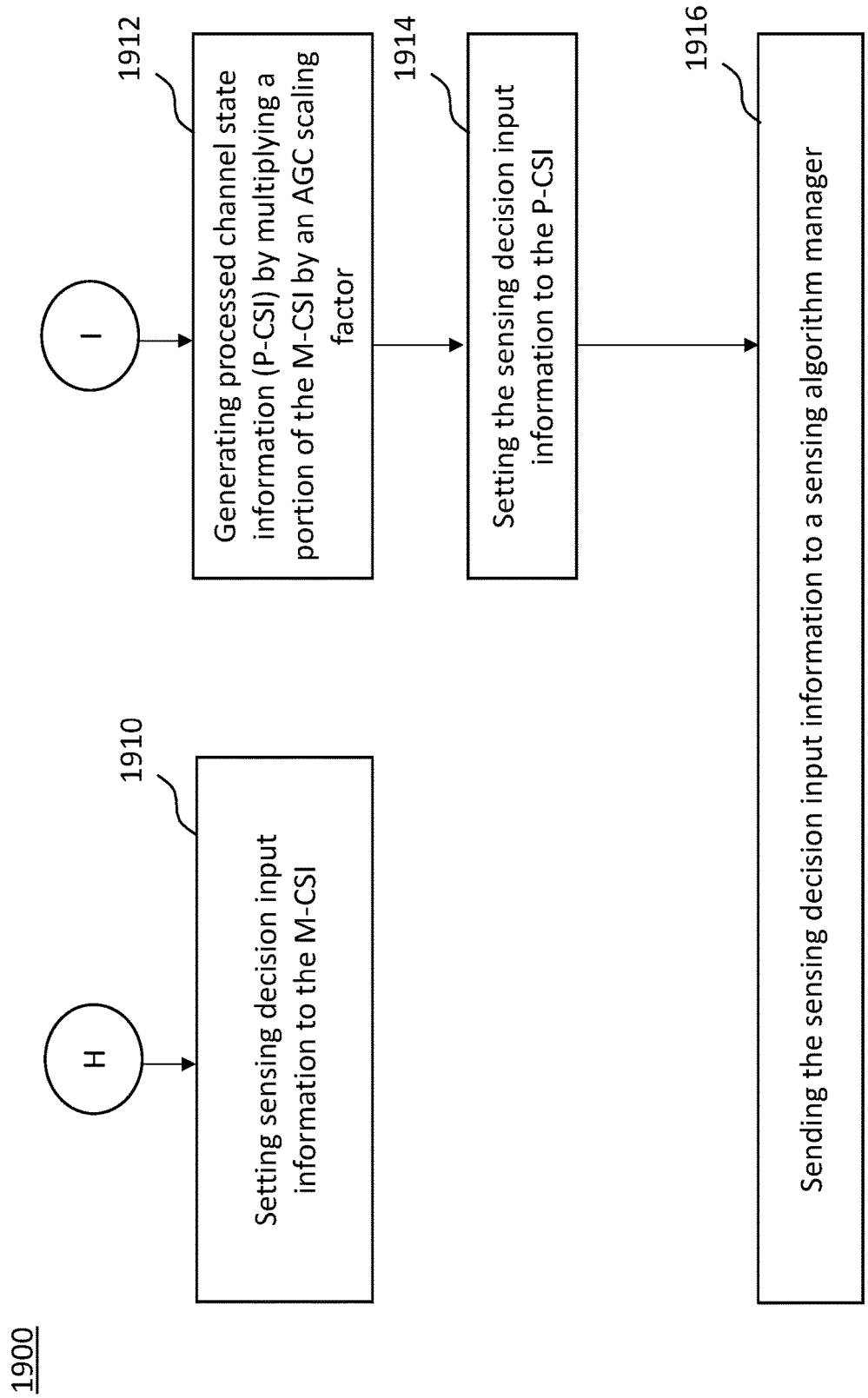

FIG. 19A and FIG. 19B depict flowchart 1900 for determining sensing decision input information according to RFE-SI, where the RFE-SI includes AGC information, according to some embodiments.

In a brief overview of an implementation of flowchart 1900, at step 1902, M-CSI representing a sensing measurement is received. At step 1904, RFE-SI is received, where the RFE-SI includes AGC information. At step 1906, it is determined whether the AGC information exceeds a first threshold. At step 1908, it is determined whether a root-mean-square of a portion of the M-CSI exceeds a second threshold. At step 1910, sensing decision input information is set to a null input. At step 1912, P-CSI is generated by multiplying a portion of the M-CSI by an AGC scaling factor. At step 1914, the sensing decision input information is set to the P-CSI. At step 1916, the sensing decision input information is sent to sensing algorithm manager 508.

Step 1902 includes receiving M-CSI representing a sensing measurement. According to an implementation, sensing decision unit 504 may be configured to receive the M-CSI representing the sensing measurement from receiving device 502.

Step 1904 includes receiving RFE-SI, where the RFE-SI includes AGC information. According to an implementation, sensing decision unit 504 may be configured to receive the RFE-SI from receiving device 502. In an example, the RFE-SI may include the AGC information.

Step 1906 includes determining whether the AGC information exceeds a first threshold. According to an implementation, sensing decision unit 504 may be configured to determine whether the AGC information exceeds the first threshold. If it is determined that the AGC information exceeds the first threshold, flowchart 1900 proceeds to step 1910 ("Yes" branch) and if it is determined that the AGC information does not exceed the first threshold, flowchart 1900 proceeds to step 1912 ("No" branch).

Step 1908 includes determining whether the root-mean-square of a portion of the M-CSI exceeds a second threshold. According to an implementation, sensing decision unit 504 may be configured to determine whether the root-mean-square of the portion of the M-CSI exceeds the second threshold. If it is determined that the the root-mean-square of the portion of the M-CSI exceeds the second threshold, flowchart 1900 proceeds to step 1910 ("Yes" branch) and if it is determined the root-mean-square of the portion of the M-CSI does not exceed the second threshold, flowchart 1900 proceeds to step 1912 ("No" branch).

Step 1910 includes setting sensing decision input information to the M-CSI input. According to an implementation, sensing decision unit 504 may be configured to set the sensing decision input information to the M-CSI.

Step 1912 includes generating P-CSI by multiplying the portion of the M-CSI by an AGC scaling factor. According to an implementation, sensing decision unit 504 may be configured to generate the P-CSI by multiplying the portion of the M-CSI by the AGC scaling factor.

Step 1914 includes setting the sensing decision input information to the P-CSI. According to an implementation, sensing decision unit 504 may be configured to set the sensing decision input information to the P-CSI.

Step 1916 includes sending the sensing decision input information to sensing algorithm manager 508. According to an implementation, sensing decision unit 504 may be configured to send the the sensing decision input information to sensing algorithm manager 508.

Embodiment 1 is a method for Wi-Fi sensing carried out by a sensing decision unit in operation on at least one processor. The method comprises receiving, by the sensing decision unit, measured channel state information (M-CSI) representing a sensing measurement; receiving, by the sensing decision unit, receiver front end state information (RFE-SI); and determining, by the sensing decision unit and according to the RFE-SI, sensing decision input information.

Embodiment 2 is the method of embodiment 1, further comprising receiving, by a receiving device including a receiver front end (RFE) having a receiving antenna, sensing transmissions from a plurality of sensing transmitters; and generating, by the receiving device, the M-CSI based on the sensing transmissions.

Embodiment 3 is the method of embodiment 2, wherein the receiving device further includes the at least one processor.

Embodiment 4 is the method of embodiment 2 or 3, wherein the RFE-SI is provided as a message to the sensing decision unit by a baseband processor of the receiving device.

Embodiment 5 is the method of any of embodiments 2-4, wherein the RFE-SI is provided as one or more digital signals to the sensing decision unit by at least one of a baseband processor of the receiving device and the RFE.

Embodiment 6 is the method of any of embodiments 2-5, wherein the RFE-SI is provided as one or more digital signals and one or more analog signals to the sensing decision unit by at least one of a baseband processor of the receiving device and the RFE.

Embodiment 7 is the method of any of embodiments 1-6, wherein the RFE-SI includes a phase variation indicator.

Embodiment 8 is the method of embodiment 7, wherein determining the sensing decision input information includes setting the sensing decision input information to a null input responsive to a determination that the phase variation indicator indicates a phase variation in the M-CSI.

Embodiment 9 is the method of any of embodiments 1-8, wherein the RFE-SI includes automatic gain controller (AGC) information.

Embodiment 10 is the method of embodiment 9, wherein determining the sensing decision input information includes setting the sensing decision input information to a null input responsive to a determination that the AGC information does not exceed a first threshold.

Embodiment 11 is the method of embodiment 9 or 10, wherein determining the sensing decision input information includes: generating processed channel state information (P-CSI) by multiplying a portion of the M-CSI by an AGC scaling factor responsive to a determination that the AGC information does not exceed a first threshold; and setting the sensing decision input information to the P-CSI.

Embodiment 12 is the method of any of embodiments 9-11, wherein determining the sensing decision input information includes: generating processed channel state information (P-CSI) by multiplying a portion of the M-CSI by an AGC scaling factor responsive to a first determination that the AGC information does not exceed a first threshold and a second determination that a strength of the portion of the M-CSI does not exceed a second threshold; and setting the sensing decision output information to the P-CSI.

Embodiment 13 is the method of any of embodiments 9-12, wherein determining the sensing decision input information includes: setting the sensing decision input information to the M-CSI responsive to a first determination that the AGC information exceeds a first threshold and a second determination that a strength of a portion of the M-CSI exceeds a second threshold.

Embodiment 14 is the method of any of embodiments 1-13, wherein the RFE-SI includes downconverter type information.

Embodiment 15 is the method of embodiment 14, wherein determining the sensing decision input information includes: calculating a group delay of the M-CSI according to the downconverter type information; generating processed channel state information (P-CSI) by adjusting the M-CSI according to the group delay; and setting the sensing decision input information to the P-CSI.

Embodiment 16 is the method of any embodiment 11-15, further comprising sending the sensing decision input information to a sensing algorithm manager.

Embodiment 17 is the method of any of embodiments 12-16, further comprising sending the sensing decision input information to a sensing algorithm manager.

Embodiment 18 is the method of any of embodiments 15-17, further comprising sending the sensing decision input information to a sensing algorithm manager.

Embodiment 19 is a system for Wi-Fi sensing. The system comprises at least one processor configured to execute instructions to operate a sensing decision unit, the instructions being configured for: receiving measured channel state information (M-CSI) representing a sensing measurement; receiving receiver front end state information (RFE-SI); and determining according to the RFE-SI, sensing decision input information.

Embodiment 20 is the system of embodiment 19, further comprising a receiving device including a receiver front end (RFE) having a receiving antenna and configured for: receiving sensing transmissions from a plurality of sensing transmitters; and generating the M-CSI based on the sensing transmissions.

Embodiment 21 is the system of embodiment 20, wherein the at least one processor is included in the receiving device.

Embodiment 22 is the system of embodiment 20 or 21, wherein the receiving device further comprises a baseband processor configured to provide the RFE-SI as a message to the sensing decision unit.

Embodiment 23 is the system of any of embodiments 20-22, wherein the receiving device is further configured to provide the RFE-SI as one or more digital signals to the sensing decision unit.

Embodiment 24 is the system of any of embodiments 20-23, wherein the receiving device is further configured to provide the RFE-SI as one or more digital signals and one or more analog signals to the sensing decision unit.

Embodiment 25 is the system of any of embodiments 19-24, wherein the RFE-SI includes a phase variation indicator.

Embodiment 26 is the system of embodiment 25, wherein the instructions for determining the sensing decision input information include instructions for setting the sensing decision input information to a null input responsive to a determination that the phase variation indicator indicates a phase variation in the M-CSI.

Embodiment 27 is the system of any of embodiments 19-26, wherein the RFE-SI includes automatic gain controller (AGC) information.

Embodiment 28 is the system of embodiment 27, wherein the instructions for determining the sensing decision input information include instructions for setting the sensing decision input information to a null input responsive to a determination that the AGC information does not exceed a first threshold.

Embodiment 29 is the system of embodiments 27 or 28, wherein the instructions for determining the sensing decision input information include instructions for: generating processed channel state information (P-CSI) by multiplying a portion of the M-CSI by an AGC scaling factor responsive to a determination that the AGC information does not exceed a first threshold; and setting the sensing decision input information to the P-CSI.

Embodiment 30 is the system of any of embodiments 27-29, wherein the instructions for determining the sensing decision input information include instructions for: generating processed channel state information (P-CSI) by multiplying a portion of the M-CSI by an AGC scaling factor responsive to a first determination that the AGC information does not exceed a first threshold and a second determination that a strength of the portion of the M-CSI does not exceed a second threshold; and setting the sensing decision output information to the P-CSI.

Embodiment 31 is the system of any of embodiments 27-30, wherein the instructions for determining the sensing decision input information include instructions for: setting the sensing decision input information to the M-CSI responsive to a first determination that the AGC information exceeds a first threshold and a second determination that a strength of a portion of the M-CSI exceeds a second threshold.

Embodiment 32 is the system of any of embodiments 19-31, wherein the RFE-SI includes downconverter type information.

Embodiment 33 is the system of embodiment 32, wherein the instructions for determining the sensing decision input information include instructions for: calculating a group delay of the M-CSI according to the downconverter type information; generating processed channel state information (P-CSI) by adjusting the M-CSI according to the group delay; and setting the sensing decision input information to the P-CSI.

Embodiment 34 is the system of any of embodiments 29-33, wherein the at least one processor is further configured with instructions for sending the sensing decision input information to a sensing algorithm manager.

Embodiment 35 is the system of any of embodiments 30-34, wherein the at least one processor is further configured with instructions for sending the sensing decision input information to a sensing algorithm manager.

Embodiment 36 is the system of any of embodiments 33-35, wherein the at least one processor is further configured with instructions for sending the sensing decision input information to a sensing algorithm manager.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for Wi-Fi sensing carried out by a sensing initiator including at least one processor, the method comprising:
obtaining, by the sensing initiator, a sensing measurement comprising channel state information (CSI) values;
obtaining, by the sensing initiator, automatic gain controller (AGC) gain information; and sending, by the sensing initiator, to a sensing algorithm using an MAC Layer Management Entity (MLME) interface, the CSI values and the AGC gain information.

2. The method of claim 1, wherein the sensing initiator is a sensing transmitter.

3. The method of claim 2, further comprising:
receiving, by a receiving antenna of the sensing transmitter, one or more sensing measurement reports including AGC gain information and CSI values from one or more sensing responders.

4. The method of claim 1, wherein the sensing initiator is a sensing receiver, the method further comprising:
receiving, by a receiver front end (RFE) having a receiving antenna of the sensing receiver, sensing transmissions from a plurality of sensing responders; and
generating, by a baseband receiver of the sensing receiver, the CSI values based on the sensing transmissions.

5. The method of claim 4, wherein the AGC gain information is provided as a message to the at least one processor by at least one of the baseband receiver and the RFE.

6. The method of claim 5, wherein the AGC gain information is provided as one or more digital signals to the at least one processor by at least one of the baseband receiver and the RFE.

7. The method of claim 5, wherein the AGC gain information is provided as one or more digital signals and one or more analog signals to the at least one processor by at least one of the baseband receiver and the RFE.

8. The method of claim 1, further comprising receiving by the sensing initiator, receiver front end state information (RFE-SI), wherein the RFE-SI includes a phase variation indicator.

9. The method of claim 1, further comprising receiving by the sensing initiator, receiver front end state information (RFE-SI), wherein the RFE-SI further includes downconverter type information.

10. The method of claim 1, wherein each CSI value comprises an in-phase component and a quadrature component.

11. The method of claim 1, wherein:
obtaining the sensing measurement includes receiving, by the sensing initiator, the sensing measurement; and
obtaining the AGC gain information includes receiving, by the sensing initiator, the AGC information.

12. A system for Wi-Fi sensing, the system comprising:
a sensing initiator including at least one processor configured to execute instructions, the instructions being configured for:
obtaining a sensing measurement comprising channel state information (CSI) values;
obtaining automatic gain controller (AGC) gain information; and
sending to a sensing algorithm using a MAC Layer Management Entity (MLME) interface, the CSI values and the AGC gain information.

13. The system of claim 12, wherein the sensing initiator is a sensing transmitter.

14. The system of claim 13, wherein the sensing transmitter is configured to receive, by a receiving antenna, one or more sensing measurement reports including AGC gain information and CSI values from one or more sensing responders.

15. The system of claim 12, wherein the sensing initiator is a sensing receiver including:
a receiver front end (RFE) having a receiving antenna and a baseband receiver, the sensing initiator further configured for:
receiving, by the RFE, sensing transmissions from a plurality of sensing responders; and
generating, by the baseband receiver, the CSI values based on the sensing transmissions.

16. The system of claim 15, wherein the at least one of the baseband receiver and the RFE is configured to provide the AGC gain information as a message to the at least one processor.

17. The system of claim 15, wherein the at least one of the baseband receiver and the RFE is configured to provide the AGC gain information as one or more digital signals to the at least one processor.

18. The system of claim 15, wherein the at least one of the baseband receiver and the RFE is configured to provide the AGC gain information as one or more digital signals and one or more analog signals to the at least one processor.

19. The system of claim 12, further comprising receiving by the sensing initiator, receiver front end state information (RFE-SI), wherein the RFE-SI includes a phase variation indicator.

20. The system of claim 12, further comprising receiving by the sensing initiator, receiver front end state information (RFE-SI), wherein the RFE-SI includes downconverter type information.

21. The system of claim 12, wherein each CSI value comprises an in-phase component and a quadrature component.

22. The system of claim 12, wherein:
obtaining the sensing measurement includes receiving, by the sensing initiator, the sensing measurement; and
obtaining the AGC gain information includes receiving, by the sensing initiator, the AGC information.

* * * * *